United States Patent
Imanishi et al.

(10) Patent No.: US 12,528,923 B2
(45) Date of Patent: Jan. 20, 2026

(54) POLYPROPYLENE FILM, METAL MEMBRANE LAYERED FILM, AND FILM CAPACITOR

(71) Applicant: Toray Industries, Inc., Tokyo (JP)

(72) Inventors: Yasuyuki Imanishi, Otsu (JP); Masatoshi Ohkura, Otsu (JP); Kohei Yamanaka, Otsu (JP)

(73) Assignee: Toray Industries, Inc., Tokyo (JP)

( * ) Notice: Subject to any disclaimer, the term of this patent is extended or adjusted under 35 U.S.C. 154(b) by 700 days.

(21) Appl. No.: 17/800,021

(22) PCT Filed: Feb. 18, 2021

(86) PCT No.: PCT/JP2021/006081
§ 371 (c)(1),
(2) Date: Aug. 16, 2022

(87) PCT Pub. No.: WO2021/166993
PCT Pub. Date: Aug. 26, 2021

(65) Prior Publication Data
US 2023/0108407 A1    Apr. 6, 2023

(30) Foreign Application Priority Data

Feb. 21, 2020 (JP) .................................. 2020-027900
Feb. 21, 2020 (JP) .................................. 2020-027901

(51) Int. Cl.
C08J 5/18 (2006.01)

(52) U.S. Cl.
CPC ............. *C08J 5/18* (2013.01); *C08J 2323/12* (2013.01)

(58) Field of Classification Search
None
See application file for complete search history.

(56) References Cited

U.S. PATENT DOCUMENTS

| | | | |
|---|---|---|---|
| 2016/0024641 A1* | 1/2016 | Monno | C23C 14/14 428/220 |
| 2018/0208751 A1 | 7/2018 | Tanike et al. | |
| 2020/0198298 A1 | 6/2020 | Imanishi et al. | |
| 2021/0380769 A1 | 12/2021 | Imanishi et al. | |
| 2022/0135780 A1 | 5/2022 | Imanishi et al. | |

FOREIGN PATENT DOCUMENTS

| | | |
|---|---|---|
| EP | 2 977 398 A1 | 1/2016 |
| EP | 3 604 403 A1 | 2/2020 |
| EP | 4 108 712 A1 | 12/2022 |
| JP | 2014231584 A | 12/2014 |
| JP | 2019-172921 A | 10/2019 |
| JP | 2019179221 A | 10/2019 |
| WO | 2016002281 A1 | 1/2016 |
| WO | 2016182003 A1 | 11/2016 |
| WO | 2017221985 A1 | 12/2017 |
| WO | 2019044758 A1 | 3/2019 |
| WO | 2020040127 A1 | 2/2020 |
| WO | 2020171163 A1 | 8/2020 |

OTHER PUBLICATIONS

Motonobu Kawai, "Film Capacitor Breakthrough, from Car to Energy", Nikkei Electronics (Japan), Nikkel Business Publications, Inc., Sep. 17, 2012, pp. 57-62, with partial English language translation.
The extended European Search Report issued Feb. 5, 2024, by the European Patent Office in corresponding European Patent Application No. 21756324.6-1102. (9 pages).
International Search Report and Written Opinion for International Application No. PCT/JP2021/006081, dated May 18, 2021, 5 pages.

* cited by examiner

*Primary Examiner* — Sheeba Ahmed
(74) *Attorney, Agent, or Firm* — Buchanan Ingersoll & Rooney PC

(57) ABSTRACT

There is provided a polypropylene film that has excellent reliability and withstand voltage characteristics in high temperature environments when used in high voltage capacitors, that has a structure with excellent stability against heat and is suitable for applications in capacitors or the like to be used at high temperatures and high voltages, and that has excellent processability and does not wrinkle during a conveyance process including a vapor deposition process. The polypropylene film has an absolute value of a difference between a crystallite size obtained by scanning an a crystal (110) plane by wide angle X-ray diffraction in a main alignment direction and a crystallite size obtained by scanning an a crystal plane in a direction orthogonal to the main alignment direction is 3.0 nm or less, and a shrinkage stress in a machine direction (SF 135 MD) is 2.0 MPa or less at 135° C. in a heating process at a temperature elevation rate of 10° C./min in thermomechanical analysis (TMA).

16 Claims, No Drawings

POLYPROPYLENE FILM, METAL MEMBRANE LAYERED FILM, AND FILM CAPACITOR

CROSS REFERENCE TO RELATED APPLICATIONS

This is the U.S. National Phase application of PCT/JP2021/006081, filed Feb. 18, 2021, which claims priority to Japanese Patent Application No. 2020-027901, filed Feb. 21, 2020 and Japanese Patent Application No. 2020-027900, filed Feb. 21, 2020, the disclosures of each of these applications being incorporated herein by reference in their entireties for all purposes.

FIELD OF THE INVENTION

The present invention particularly relates to a polypropylene film preferably used for capacitor applications.

BACKGROUND OF THE INVENTION

Since polypropylene films are excellent in transparency, mechanical characteristics, electrical characteristics, and the like, polypropylene films have been used in various applications such as packaging applications, tape applications, and electrical applications including cable wrapping and capacitors.

Among them, in capacitor applications, the polypropylene film is particularly preferably used not only for direct current and alternating current but also for high voltage capacitors due to the excellent voltage resistance and low loss characteristics thereof.

Recently, various electric devices have been inverterized, and accordingly, demands for miniaturization and capacitance enlargement of capacitors have been further increased. In response to such a demand, particularly from automobile applications (including hybrid car applications), solar power generation, and wind power generation applications, the polypropylene film has been required to have a reduced film thickness, improved breakdown voltage, and excellent reliability capable of maintaining characteristics in long-term use in a high temperature environment.

The polypropylene film has been considered to have high heat resistance and high breakdown voltage among polyolefin-based films. On the other hand, in application to the above-described fields, it is required to exhibit excellent dimensional stability at a use environmental temperature and stable performance as electrical performance such as electrical resistance even in a region 10° C. to 20° C. higher than the use environmental temperature. Here, from the viewpoint of the heat resistance, when considering power semiconductor applications using silicon carbide (SiC) in the future, the use environmental temperature is expected to be higher. From the demand for higher heat resistance and higher voltage resistance as a capacitor, the improvement of a breakdown voltage of a film under a high temperature environment exceeding 110° C. is required. However, as disclosed in Non-Patent Document 1, the upper limit of operating temperature of the polypropylene film is said to be about 110° C., and it is extremely difficult to stably maintain the breakdown voltage under such a temperature environment.

In addition, even in the process of vapor deposition processing of the film, the orientation of the film may be relaxed by receiving a thermal history due to radiant heat, and thus it is difficult for a film that is unstable to heat to sufficiently exhibit the voltage resistance performance originally possessed by the film as a capacitor.

As a method for obtaining excellent performance under a high temperature environment when a polypropylene film is used as a thin film and is used as a capacitor, for example, there have been proposed a film that can be used as a capacitor for a long period of time at a high temperature by controlling a crystallite size of an x (040) plane obtained by wide angle X-ray diffraction, optical birefringence, and the total volume of surface protrusions having a certain height (for example, Patent Document 1), and a film that can be used as a capacitor by blending polypropylene resins having different viscosities, and rapidly cooling the blend after melt-extrusion to form a mesomorphic phase in a cast sheet, thereby reducing recessed portions of protrusions on the film surface and exhibiting a high breakdown voltage even under a high temperature environment due to a smooth surface (for example, Patent Document 2). Furthermore, it has been proposed that the dielectric breakdown strength is improved by using a polypropylene raw material having a strain hardening parameter within a certain range (for example, Patent Document 3).

PATENT DOCUMENTS

Patent Document 1: Japanese Patent Laid-open Publication No. 2014-231584
Patent Document 2: Japanese Patent Laid-open Publication No. 2019-179221
Patent Document 3: International Publication No. 2017/221985

Non-Patent Document

Non-Patent Document 1: MOTONOBU KAWAI: "Film Capacitor Breakthrough, from Car to Energy", NIKKEI ELECTRONICS (Japan), Nikkei Business Publications, Inc., 17 Sep. 2012, pages 57-62

SUMMARY OF THE INVENTION

The polypropylene film disclosed in Patent Document 1 has, however, breakdown voltages improved insufficiently under a high temperature environment in excess of 110° C., and moreover, a withstand voltage in a case of use as a capacitor and reliability under a high temperature environment are considered far from sufficient.

Furthermore, in the polypropylene film disclosed in Patent Document 2, the protrusion height of the film having a high breakdown voltage even under high temperature of 115° C. is not sufficient, wrinkles may occur particularly in a vapor deposition processing step, and under a high temperature environment in excess of 115° C., reliability may deteriorate when the film is formed into a capacitor.

Furthermore, the polypropylene film disclosed in Patent Document 3 is not supposed to be used under a high temperature environment, and the withstand voltage and reliability of the capacitor may be impaired in a temperature range exceeding 110° C.

Here, an object of the present invention is to provide a polypropylene film that has a structure excellent in stability relative to heat, is suitable for use in the capacitor and the like used under high temperature and high voltage, has excellent withstand voltage characteristics and reliability in high temperature environments, and can obtain appropriate processability, and also to provide a metal layer laminated film and a film capacitor using the polypropylene film.

The present inventors have intensively studied to solve the above-described problems and considered the reason why the polypropylene films disclosed in Patent Documents 1 to 3 have insufficient breakdown voltages under high temperature environments and insufficient withstand voltage characteristics, reliability, and processability under a high temperature environment when used as a capacitor as follows.

That is, it can be said that the polypropylene film disclosed in Patent Document 1 has sufficient voltage resistance and reliability in an environment at 110° C. as a capacitor, but when considering voltage resistance in a further high temperature environment, it is considered that a stretching ratio, heat treatment, and fixing of the orientation and structure of molecular chains in film formation are not necessarily sufficient, and there is the problem that the orientation of amorphous chains of the film is relaxed at a higher temperature, and a withstand voltage is lowered. It has been considered that there is a problem that sufficient lubricity may not be obtained because the film surface of the polypropylene film disclosed in Patent Document 2 is smooth, and blending a polypropylene raw material having a low melt flow rate (MFR) causes generation of a gel to cause a decrease in the withstand voltage, or the film may be broken during film formation due to the gel serving as a starting point. The polypropylene film in Patent Document 3 contains a polypropylene raw material having a strain hardening property within a certain range, but since there is no idea of controlling the structure of the film by optimizing the stretching conditions during film formation, the orientation of molecular chains and the fixing of the structure are not necessarily sufficient, and it has been considered that there is the problem that the orientation of amorphous chains is relaxed under a high temperature environment, and the withstand voltage may be lowered.

Based on the above considerations, the present inventors have further studied and found that the above problems can be solved by providing a film in which a difference between a crystallite size (of Through-TD) obtained by scanning an α crystal (110) plane of wide angle X-ray diffraction in a main alignment direction and a crystallite size (Through-MD) obtained by scanning a direction orthogonal to a main alignment direction is a certain value or less, and a shrinkage stress in a machine direction at 135° C. in thermomechanical analysis (TMA) is a certain value or less.

That is, the present invention according to exemplary embodiments provides a polypropylene film in which an absolute value of a difference between a crystallite size obtained by scanning an α crystal (110) plane by wide angle X-ray diffraction in a main alignment direction and a crystallite size obtained by scanning an α crystal plane in a direction orthogonal to the main alignment direction is 3.0 nm or less, and a shrinkage stress in a machine direction (SF 135 MD) is 2.0 MPa or less at 135° C. in a heating process at a temperature elevation rate of 10° C./min in thermomechanical analysis (TMA).

The present invention also relates to a metal layer laminated film having a metal layer on at least one surface of the polypropylene film according to embodiments of the present invention.

The present invention also relates to a film capacitor formed using the metal layer laminated film according to embodiments of the present invention.

According to the present invention, there is provided a polypropylene film that is excellent in structural stability relative to heat, is suitable for use in the capacitor and the like used under high temperature and high voltage, has excellent withstand voltage characteristics and reliability in high temperature environments, and can obtain appropriate processability in which wrinkle is less likely to occur in a conveyance step including a vapor deposition step. In addition, a metal layer laminated film and a film capacitor using the same are provided.

DETAILED DESCRIPTION OF EMBODIMENTS OF THE INVENTION

Hereinafter, the present invention will be described in detail. In the present invention, "or more" means the same as or more than the numerical value indicated therein. In addition, "or less" means the same as or less than the numerical value indicated therein. The "room temperature" means 23° C.

A polypropylene film of the present invention preferably contains a linear polypropylene resin as a main component. The main component herein means a component having the highest percentage by mass (a component of a large content) among components constituting the polypropylene film.

Hereinafter, the polypropylene film may be simply referred to as a film.

The polypropylene resin is mainly made of a homopolymer of propylene, but a copolymerizing component based on another unsaturated hydrocarbon may be used, or a polymer that is not a homopolymer of propylene may be blended as long as the object of the present invention is not impaired. Examples of a monomer component other than propylene constituting such a copolymerizing component or blend include ethylene, 1-butene, 1-pentene, 3-methylpentene-1, 3-methylbutene-1,1-hexene, 4-methylpentene-1,5-ethylhexene-1,1-octene, 1-decene, 1-dodecene, vinylcyclohexene, styrene, allylbenzene, cyclopentene, norbornene, and 5-methyl-2-norbornene.

The copolymerization amount or blending amount of components other than the propylene component is preferably 1 mol % or less as the copolymerization amount from the viewpoint of the breakdown voltage and heat resistance, and the blending amount is preferably 1% by mass or less of the entire resin constituting the film as the amount of components other than propylene.

The polypropylene film of the present invention preferably has a $M_{z+1}$/Mw of 3 or more and 10 or less with respect to its weight average molecular weight Mw and z+1 average molecular weight $M_{z+1}$. By setting $M_{z+1}$/Mw to 10 or less, more preferably 7.9 or less, still more preferably 6.9 or less, particularly preferably 6.5 or less, and most preferably 6.1 or less, a uniform structure with a narrow molecular weight distribution and little local unevenness can be obtained even as a film structure, thermal shrinkage can be suppressed, and an effect of improving a breakdown voltage under a high temperature environment can be obtained.

Means for controlling $M_{z+1}$/Mw to be within the above-described range can be achieved by using, as the polypropylene resin A, a raw material having a meso-pentad fraction of 0.97 or more or a chip melting point of 160° C. or higher, a cold xylene soluble component (CXS) of less than 3% by mass, a number average molecular weight (Mn) of 70,000 ($7.0 \times 10^4$) or less, and a Z+1 average molecular weight ($M_{z+1}$) of less than 3.0 million ($3.0 \times 10^6$), and appropriately blending a polypropylene resin B and/or a polypropylene resin C within the preferable range of the present application.

The polypropylene film of the present invention may contain various additives, for example, organic particles, inorganic particles, a crystal nucleating agent, an antioxidant, a heat stabilizer, a chlorine scavenger, a sliding agent, an antistatic agent, an antiblocking agent, a filler, a viscosity modifier, and a coloring inhibitor as long as the object of the present invention is not impaired.

When an antioxidant is contained, selection of the type and additional amount of the antioxidant is preferably performed from the viewpoint of long-term heat resistance. The antioxidant is preferably a phenol-based antioxidant having steric hindrance, and at least one of the antioxidants is preferably a high molecular weight type having a molecular weight of 500 or more. Specific examples thereof include various examples, and for example, it is preferable to use 2,6-di-t-butyl-p-cresol (BHT: molecular weight 220.4) in combination with 1,3,5-trimethyl-2,4,6-tris(3,5-di-t-butyl-4-hydroxybenzyl)benzene (for example, "Irganox" (registered trademark) 1330: molecular weight 775.2, available from BASF) or tetrakis [methylene-3 (3,5-di-t-butyl-4-hydroxyphenyl) propionate]methane (for example, "Irganox" (registered trademark) 1010: molecular weight 1,177.7, available from BASF). The total content of these antioxidants is preferably in the range of 0.1% by mass or more to 1.0% by mass or less with respect to the total amount of polypropylene. When the content is 0.1% by mass or more, and more preferably 0.2% by mass or more, the long-term heat resistance is excellent. When the content is 1.0% by mass or less, more preferably 0.7% by mass or less, and still more preferably 0.4% by mass or less, blocking at a high temperature due to bleeding out of the antioxidant can be suppressed, and adverse effects on the capacitor element can be prevented.

The polypropylene film of the present invention may contain a resin other than the polypropylene resin as long as the object of the present invention is not impaired. Examples of the resin other than the polypropylene resin include vinyl polymer resins containing various polyolefin-based resins, polyester-based resins, polyamide-based resins, polyphenylene sulfide-based resins, polyimide-based resins, and polycarbonate-based resins. Particularly preferable examples include polymethylpentene, a cycloolefin copolymer, a cycloolefin polymer, and syndiotactic polystyrene. The content of the resin other than the polypropylene resin is preferably less than 30% by mass, more preferably 19% by mass or less, still more preferably 15% by mass or less, most preferably 9% by mass or less, when the total amount of the resin components constituting the polypropylene film is 100% by mass. If the content of the resin other than the polypropylene resin is 30% by mass or more, the influence of a domain boundary is large, so that the breakdown voltage under a high temperature environment may be lowered.

In the polypropylene film according to embodiments of the present invention, it is important that an absolute value (hereafter, referred to as "difference in the crystallite size depending on the alignment direction of the α crystal (110) plane") of a difference between a crystallite size obtained by scanning an a crystal (110) plane by wide angle X-ray diffraction in a main alignment direction and a crystallite size obtained by scanning an a crystal plane in a direction orthogonal to the main alignment direction is 3.0 nm or less, and a shrinkage stress in a machine direction (SF 135 MD) is 2.0 MPa or less at 135° C. in a heating process at a temperature elevation rate of 10° C./min in thermomechanical analysis (TMA).

The polypropylene film according to embodiments of the present invention is not a microporous film. Here, the microporous film is defined as a film having a pore structure that penetrates both surfaces of the film and has air permeability of 5,000 seconds/100 mL or less at a permeation time of 100 mL of air at 23° C. and a relative humidity of 65% using a B-type Gurley tester of JIS P 8117 (2009).

In the polypropylene film according to embodiments of the present invention, it is important that the difference in the crystallite size depending on the alignment direction of the α crystal (110) plane is 3.0 nm or less, and the shrinkage stress SF 135 MD is 2.0 MPa or less.

In the polypropylene film according to embodiments of the present invention, the difference in the crystallite size depending on the alignment direction of the α crystal (110) plane has a high correlation with the withstand voltage characteristics and reliability of the capacitor under a high temperature environment, and the thermal shrinkage stress SF 135 MD affects the processability and withstand voltage characteristics when the film is used as a capacitor. In capacitor applications, in order to obtain a polypropylene film having high reliability even in long-term use in a high temperature environment, it is important to control the difference in the crystallite size depending on the alignment direction of the α crystal (110) plane and the thermal shrinkage stress SF 135 MD to be equal to or less than certain values, particularly in terms of capacitor withstand voltage characteristics, long-term reliability, and processability under a high temperature environment.

The fact that the difference in the crystallite size depending on the alignment direction of the α crystal (110) plane of the polypropylene film is 3.0 nm or less suggests that the difference in the width of the crystal lamella constituting the film between the machine direction and the transverse direction is small, and the structure is more uniform. By setting the difference in the crystallite size depending on the alignment direction of the α crystal (110) plane to 3.0 nm or less, preferably 2.5 nm or less, more preferably 2.1 or less, still more preferably 1.9 nm or less, and even more preferably 1.7 nm or less, the structural difference is small, a more uniform structure is obtained, the crystal orientation degree is easily increased, and the structural change is suppressed to be small even when the film is heated. As a result, the film has a very stable structure particularly in a high temperature environment, and exhibits a high breakdown voltage even at a high temperature, so that a leakage current decreases when the film is used as a capacitor, and excellent reliability can be exhibited in a high temperature environment. In a case where the difference in the crystallite size depending on the alignment direction of the α crystal (110) plane is larger than 3.0 nm, when the film is used as a capacitor under a high temperature environment where a high voltage is applied, particularly when the film is placed in a high temperature state for a long time, the crystal denseness of the film is low, and molecular chain relaxation of an amorphous part connecting adjacent crystal lamellae proceeds to lower the withstand voltage. Therefore, capacitor capacitance reduction, short-circuit breakdown, and the like occur, resulting in a capacitor with poor reliability. The difference in the crystallite size depending on the alignment direction of the α crystal (110) plane is preferably 0.5 nm or more from the viewpoint of reducing the structural difference of the entire film, achieving a more uniform structure, and stably obtaining a film even when biaxially stretched.

The difference in the crystallite size can be reduced by stretching an unstretched sheet in which a β-spherulite size is controlled to be small at a high area ratio in the stretching step, and particularly by stretching the sheet at a high ratio in the transverse direction. As described later, for example, a polypropylene raw material A and/or a polypropylene raw material B having a high meso-pentad fraction and a cold xylene soluble component (CXS) of less than 3.0% by mass is used as a polypropylene raw material A (also referred to as a polypropylene resin (A). The same applies to a polypropylene raw material (B) and a polypropylene raw material (C) described later), a branched-chain polypropylene raw material C is contained, the temperature of a casting drum is set to a preferable range to be described later, preliminary stretching to 1.01 times or more and 1.10 times or less is performed before stretching in the machine direction, an area stretching ratio is set to 60 times or more and preferably 65 times or more during biaxial stretching and a stretching ratio in the transverse direction is set to 11.0 times or more, and in heat fixation treatment and relaxation treatment steps after the biaxial stretching, first, a relaxation treatment is performed while heat treatment (first stage) at a temperature lower than the stretching temperature in the transverse direction is performed, and subsequently, the film is appropriately subjected to a multi-stage heat fixation treatment and a relaxation treatment in which a heat treatment (second stage) is performed at a temperature lower than the first stage heat treatment temperature and 135° C. or higher, and a heat treatment (third stage) is further performed at 80° C. or higher and lower than the second stage heat treatment temperature while maintaining tension in the transverse direction. As described above, a polypropylene film having a small difference in the crystallite size depending on the alignment direction of the α crystal (110) plane can be preferably obtained.

The polypropylene film according to embodiments of the present invention is required to have a shrinkage stress (SF 135 MD) in the machine direction at 135° C. of 2.0 MPa or less in a heating process of thermomechanical analysis (TMA). By setting SF 135 MD to 2.0 MPa or less, preferably 1.8 MPa or less, more preferably 1.5 MPa or less, and still more preferably 1.3 MPa or less, shrinkage of the film itself can be suppressed by heat in a capacitor production step and a use step. Therefore, since the element is not strongly wound and tightened when used as a capacitor, a self-healing function (self-healing) operates by holding an appropriate gap between film layers, penetrating short-circuit breakdown accompanied by a rapid capacitance reduction is suppressed, and reliability as a capacitor is enhanced. When SF 135 MD is higher than 2.0 MPa, when the film is used as a capacitor under a high temperature environment where a high voltage is applied, particularly when the film is placed in a high temperature state for a long time, molecular chain relaxation of the film proceeds to lower the withstand voltage. Therefore, capacitor capacitance reduction, short-circuit breakdown, and the like occur, resulting in a capacitor with poor reliability.

On the other hand, SF 135 MD is preferably 0.1 MPa or more. When the SF 135 MD is set to 0.1 MPa or more, shrinkage of the film itself becomes sufficient by heat in the capacitor production step and the use step, and a capacitance according to design can be obtained.

The SF 135 MD within a preferable range as described above can be obtained in such a manner that, as described later, for example, a raw material having a high meso-pentad fraction and a cold xylene soluble component (CXS) of less than 3% by mass is used as the polypropylene raw material (A), preliminary stretching to 1.01 times or more and to 1.10 times or less is performed before stretching in the machine direction, an area stretching ratio is set to 65 times or more during biaxial stretching and a stretching ratio in the transverse direction is set to 11.0 times or more, and in heat fixation treatment and relaxation treatment steps after the biaxial stretching, first, a relaxation treatment is performed while heat treatment (first stage) at a temperature lower than the stretching temperature in the transverse direction is performed, and subsequently, the film is appropriately subjected to a multi-stage heat fixation treatment and a relaxation treatment in which a heat treatment (second stage) is performed at a temperature lower than the first stage heat treatment temperature and 135° C. or higher, and a heat treatment (third stage) is further performed at 80° C. or higher and lower than the second stage heat treatment temperature while maintaining tension in the transverse direction.

Here, in the polypropylene film according to embodiments of the present invention, the "machine direction" is a direction corresponding to the flow direction in a film production step (hereinafter sometimes referred to as "MD"), and the "transverse direction" is a direction orthogonal to the flow direction in the film production process (hereinafter, sometimes referred to as "TD"). When the film sample has a shape such as a reel or a roll, it can be said that a film winding direction is the machine direction. On the other hand, in the case of a film in which it is unknown which direction corresponds to the flow direction in the film production step from the appearance of the film, a slit-shaped film piece is sampled, the breaking strength is obtained with a tensile tester, a direction in which the maximum breaking strength is given is regarded as a film transverse direction and a main alignment direction, and a direction orthogonal to the film transverse direction is regarded as a direction orthogonal to a machine direction and the main alignment direction. Although details will be described later, when the width of the sample is less than 50 mm and the breaking strength cannot be obtained by a tensile tester, the crystal orientation of the α crystal (110) plane by wide-angle X-ray is measured as follows and defined as the film machine direction and the film transverse direction based on the following criteria. That is, an X-ray (CuKα ray) is incident in a direction perpendicular to a film surface, a crystal peak at 2θ=about 14° (α crystal (110) plane) is scanned in a circumferential direction, a direction in which the diffraction intensity of the obtained diffraction intensity distribution is the highest is defined as the film transverse direction and the main alignment direction, and a direction perpendicular thereto is defined as a direction orthogonal to the machine direction and the main alignment direction.

The polypropylene film of the present invention preferably has a crystallite size (of Through-MD) of 10.0 nm or less, which is obtained by scanning in a direction orthogonal to the main alignment direction of the α crystal (110) plane, as measured by wide angle X-ray diffraction. By setting the crystallite size to 10.0 nm or less, more preferably 8.0 nm or less, still more preferably 6.9 nm or less, particularly preferably 6.6 nm or less, and most preferably 6.4 nm or less, crystals become fine, the crystal orientation degree is also increased, and a high breakdown voltage is exhibited even at a high temperature. Therefore, when used as a capacitor, the leakage current decreases, and excellent reliability can be exhibited in a high temperature environment. The lower limit of the crystallite size obtained by scanning in the direction orthogonal to the main alignment direction of the α crystal (110) plane is substantially 3.0 nm from the viewpoint of reducing the structural difference of the entire film, achieving a more uniform structure, and stably obtaining a film even when biaxially stretched.

In addition, the polypropylene film of the present invention preferably has a crystallite size (of Through-TD) of 10.0 nm or less, which is obtained by scanning in the main alignment direction of the α crystal (110) plane, as measured by wide angle X-ray diffraction. By setting the crystallite size to 10.0 nm or less, more preferably 9.0 nm or less, still more preferably 8.9 or less, particularly preferably 8.7 nm or less, and most preferably 8.5 nm or less, crystals become fine, the crystal orientation degree is also increased, and a high breakdown voltage is exhibited even at a high temperature. Therefore, when used as a capacitor, the leakage current decreases, and excellent reliability can be exhibited in a high temperature environment. The lower limit of the crystallite size obtained by scanning in the main alignment direction of the α crystal (110) plane is substantially 5.0 nm from the viewpoint of reducing the structural difference of the entire film, achieving a more uniform structure, and stably obtaining a film even when biaxially stretched.

In the polypropylene film of the present invention, the crystal orientation degree of the α crystal (110) plane measured by wide angle X-ray diffraction is preferably 0.77 or more. By setting the crystal orientation degree to 0.77 or more, more preferably 0.78 or more, still more preferably 0.80 or more, and still more preferably 0.82 or more, it is possible to reduce disorder of the orientation order of the crystal structure constituting the film and to suppress the occurrence of a portion where breakdown is likely to occur partially. Therefore, in the case of a capacitor, the occurrence of capacitance reduction and short-circuit breakdown is suppressed even under a high temperature environment, and the voltage resistance is maintained, so that high reliability can be obtained. On the other hand, the crystal orientation degree of the x crystal (110) plane measured by wide angle X-ray diffraction is preferably 0.95 or less from the viewpoint of stably obtaining a film after biaxial stretching.

The crystal orientation degree of the α crystal (110) plane as described above can be achieved, for example, by using a polypropylene raw material A and/or a polypropylene raw material B high meso-pentad fraction and a cold xylene soluble component (CXS) of less than 3.0% by mass is used as the polypropylene raw material A, containing a branched-chain polypropylene raw material C, performing preliminary stretching to 1.01 times or more and 1.10 times or less before stretching in the machine direction, and setting an area stretching ratio to 60 times or more and preferably 65 times or more during biaxial stretching and a stretching ratio in the transverse direction to 11.0 times or more.

In the polypropylene film of the present invention, the crystal orientation degree of the α crystal (110) plane is preferably 0.73 or more when the film after being heated at 125° C. for 60 minutes is measured by wide angle X-ray diffraction. By setting the crystal orientation degree to 0.73 or more, more preferably 0.75 or more, still more preferably 0.78 or more, and still more preferably 0.81 or more, the orientation order of the crystal structure constituting the film is kept high, and the occurrence of a portion where breakdown is likely to occur partially is suppressed, and in the case of a capacitor, the occurrence of capacitance reduction and short-circuit breakdown is suppressed even under a high temperature environment, and a decrease in voltage resistance is suppressed, so that high reliability can be obtained.

On the other hand, from the viewpoint of stably obtaining a film after biaxial stretching, the crystal orientation degree of the α crystal (110) plane when the polypropylene film after heating at 125° C. for 60 minutes is measured by wide angle X-ray diffraction is preferably 0.95 or less. The lower limit of the crystal orientation degree of the α crystal (110) plane is not particularly limited, and is 0.60 from the viewpoint of reducing disorder of the orientation order of the crystal structure constituting the film and suppressing the occurrence of a portion where breakdown is likely to occur partially.

The crystal orientation degree of the α crystal (110) plane when the film after heating at 125° C. for 60 minutes is measured by wide angle X-ray diffraction can be obtained in such a manner that, as described later, for example, a raw material having a high meso-pentad fraction and a cold xylene soluble component (CXS) of less than 3.0% by mass is used as the polypropylene raw material (A), preliminary stretching to 1.01 times or more and to 1.10 times or less is performed before stretching in the machine direction, an area stretching ratio is set to 60 times or more or preferably 65 times or more during biaxial stretching and a stretching ratio in the transverse direction is set to 11.0 times or more, and in heat fixation treatment and relaxation treatment steps after the biaxial stretching, first, a relaxation treatment is performed while heat treatment (first stage) at a temperature lower than the stretching temperature in the transverse direction is performed, and subsequently, the film is appropriately subjected to a multi-stage heat fixation treatment and a relaxation treatment in which a heat treatment (second stage) is performed at a temperature lower than the first stage heat treatment temperature and 145° C. or higher, and a heat treatment (third stage) is further performed at 80° C. or higher and lower than the second stage heat treatment temperature while maintaining tension in the transverse direction.

In the polypropylene film of the present invention, the sum of a stress (F5MD) at 5% elongation in the film machine direction when the film after being heated at 150° C. for 10 minutes is subjected to a tensile test at room temperature and a stress (F5TD) at 5% elongation in the film transverse direction when the film after being heated under the same conditions is subjected to a tensile test at room temperature is preferably 150 MPa or more. By setting the sum of F5MD and F5TD to 150 MPa or more, more preferably 170 MPa or more, still more preferably 180 MPa or more, and even more preferably 190 MPa or more, it is possible to obtain rigidity under a high temperature environment and high reliability in the case of a capacitor.

On the other hand, the sum of F5MD and F5TD is preferably 300 MPa or less. When the pressure is 300 MPa or less, it is possible to suppress the film formability from being deteriorated due to breakage in the film formation step.

The sum of F5MD and F5TD within the range as described above can be obtained in such a manner that, as described later, for example, a raw material having a high meso-pentad fraction and a cold xylene soluble component (CXS) of less than 3.0% by mass is used as the polypropylene raw material (A), preliminary stretching to 1.01 times or more and to 1.10 times or less is performed before stretching in the machine direction, an area stretching ratio is set to 65 times or more during biaxial stretching and a stretching ratio in the transverse direction is set to 11.0 times or more, and in heat fixation treatment and relaxation treatment steps after the biaxial stretching, first, a relaxation treatment is performed while heat treatment (first stage) at a temperature lower than the stretching temperature in the transverse direction is performed, and subsequently, the film is appropriately subjected to a multi-stage heat fixation treatment and a relaxation treatment in which a heat treatment (second stage) is performed at a temperature lower than the first stage heat treatment temperature and 145° C. or higher, and a heat treatment (third stage) is further performed at 80° C. or higher and lower than the second stage heat treatment temperature while maintaining tension in the transverse direction.

The polypropylene film of the present invention preferably has a thermal shrinkage ratio in the transverse direction (HS 125 TD) of 1.0% or less after heat treatment at 125° C. for 15 minutes. By setting the thermal shrinkage ratio to 1.0% or less, more preferably 0.8% or less, still more preferably 0.6% or less, and even more preferably 0.4% or less, it is possible to suppress shrinkage of the film due to heat in the capacitor production step and use step and deterioration of voltage resistance due to poor contact with the metal-sprayed part at the end of the element, and to prevent deterioration of reliability due to capacitance reduction or short-circuit breakdown due to winding and tightening of the element.

On the other hand, the thermal shrinkage ratio in the transverse direction after heating at 125° C. for 15 minutes is preferably 0.02% or more. When the ratio is 0.02% or more, it is possible to prevent the wound state of the element from being loosened due to heat in the capacitor production step or use step.

The thermal shrinkage ratio, within the above-described range, in the heat treatment at 125° C. for 15 minutes in the film transverse direction can be obtained in such a manner that, as described later, for example, a raw material having a high meso-pentad fraction and a cold xylene soluble component (CXS) of less than 3.0% by mass is used as the polypropylene raw material A, preliminary stretching to 1.01 times or more to 1.10 times or less is performed before stretching in the machine direction, an area stretching ratio is set to 60 times or more and preferably 65 times or more during biaxial stretching and a stretching ratio in the transverse direction is set to 11.0 times or more, and in heat fixation treatment and relaxation treatment steps after the biaxial stretching, first, a relaxation treatment is performed while heat treatment (first stage) at a temperature lower than the stretching temperature in the transverse direction is performed, and subsequently, the film is appropriately subjected to a multi-stage heat fixation treatment and a relaxation treatment in which a heat treatment (second stage) is performed at a temperature lower than the first stage heat treatment temperature and 135° C. or higher, and a heat treatment (third stage) is further performed at 80° C. or higher and lower than the second stage heat treatment temperature while maintaining tension in the transverse direction.

For the polypropylene film of the present invention, the melting peak temperature (Tm) of a film obtained by heating the film from 30° C. to 260° C. at 20° C./min with a differential scanning calorimetry DSC is preferably 170° C. or higher. By setting Tm to 170° C. or higher, more preferably 171° C. or higher, still more preferably 172° C. or higher, even more preferably 173° C. or higher, and even still more preferably 174° C. or higher, the breakdown voltage under a high temperature environment can be effectively improved. On the other hand, Tm is preferably 200° C. or lower from the viewpoint that the polypropylene resin can be industrially produced.

The Tm in the above range can be achieved, for example, by using a raw material having a high meso-pentad fraction and a cold xylene soluble component (CXS) of less than 3.0% by mass as the polypropylene raw material A as described later.

In the polypropylene film of the present invention, a difference (Tm−Tc) between the melting peak temperature (Tm) obtained by heating the film from 30° C. to 260° C. at 20° C./min with a differential scanning calorimetry DSC, and crystallization peak temperature (Tc) obtained by lowering the temperature from 260° C. to 30° C. at 20° C./min after the heating is preferably 65° C. or lower. By setting the (Tm−Tc) to 65° C. or lower, more preferably 63° C. or lower, still more preferably 61° C. or lower, even more preferably 59° C. or lower, and even still more preferably 57° C. or lower, the crystallization time in a cooling and solidification process of the resin can be shortened, and the formation of coarse spherulites can be suppressed. By suppressing the formation of such coarse spherulites in the cast sheet, it is possible to reduce the occurrence of internal voids in the stretching step and the decrease in reliability when the cast sheet is formed into a capacitor due to the formation of coarse protrusions on the surface.

Furthermore, it is also possible to prevent the lubricity of the film from deteriorating and the processability from deteriorating due to an increase in the number of flat portions on the entire film surface.

On the other hand, the difference (Tm−Tc) between Tm and Tc is preferably 40° C. or higher. When the temperature is 40° C. or higher, the film formation stability is excellent.

In this regard, in a case where the polypropylene film according to embodiments of the present invention is a film including polypropylene and a thermoplastic resin that is incompatible with polypropylene, the melting peak temperature of the incompatible resin may be observed at a temperature that is different from the melting peak temperature of polypropylene, but in the present invention, the temperature of peaks observed at 170° C. or higher and 200° C. or lower are regarded as the melting peak temperature (Tm) and the crystallization peak temperature (Tc) of the polypropylene film of the present invention. In this regard, there is a case where two or more peaks are observed within the temperature range or a case of a peak temperature that can be observed on a multi-stage DSC chart referred to as a shoulder (observed in the case of a chart with two or more peaks overlapped with each other), but in the present invention, peaks with the largest absolute values of vertical axis heat flow (unit: mW) on a DSC chart are selected and respectively regarded as Tm and Tc.

The (Tm−Tc) in the range as described above can be achieved, for example, by using a polypropylene raw material A and/or a polypropylene raw material B high meso-pentad fraction and a cold xylene soluble component (CXS) of less than 3.0% by mass is used as the polypropylene raw material A, containing a branched-chain polypropylene raw material C, and adjusting the ratio of these components.

The polypropylene film according to the present invention preferably has a skewness (Ssk) defined by ISO 25178 on at least one surface of the film of more than -30 and less than 5 to exhibit a high breakdown voltage even under a high temperature environment and to exhibit, when used as a capacitor, voltage resistance and reliability even under a high temperature environment. Here, Ssk is a parameter indicating the degree of bias of unevenness on the surface. Ssk represents the cubic mean of Z (x, y) on a reference surface made dimensionless by the cube of the root mean square height Sq and means the skewness, which is a numerical value representing the symmetry of mountain parts and valley parts centered on the average surface. Therefore, when Ssk is smaller than 0, it means that the surface is biased downward with respect to the average line, that is, there are more concave valley parts than convex mountain parts. On the other hand, when Ssk is larger than 0, it means that the surface is biased upward with respect to the average line, that is, there are more convex mountain parts than concave valley parts. When the degree of bias Ssk is 0, it means a symmetric state (normal distribution) with respect to the average line.

By setting Ssk to more than-30, more preferably-28 or more, and still more preferably-26 or more, excessive unevenness of the shape having recesses on the film surface is suppressed, and particularly in applications of capacitors for high voltage, the voltage resistance is hardly impaired even under a high temperature environment, the lubricity of the film is obtained, and excellent processability can be obtained.

On the other hand, by setting Ssk to less than 5, more preferably 4 or less, and still more preferably 3 or less, it is possible to suppress the excessive presence of the shape of the protrusion on the film surface, to suppress the generation of a gap between the film and the film when used as a capacitor, to prevent the capacitance reduction in a high temperature environment, and to prevent deterioration of the voltage resistance and processability due to impairment of the lubricity of the film.

The (Ssk) in the polypropylene film of the present invention can be set to fall within the above-described range by, for example, using the polypropylene raw material B having preferable characteristics to be described later, setting the area stretching ratio to 60 times or more or preferably 65 times or more during biaxial stretching and the stretching ratio in the transverse direction to 11.0 times or more, and controlling the casting drum temperature, the melting peak temperature (Tm) and the crystallization peak temperature (Tc) of the film to fall within preferable ranges.

In the polypropylene film of the present invention, it is preferable that the projecting mountain part heights SpkA and SpkB defined in ISO 25178 of the surface A on one side and the surface B on the other side satisfy the following relationships:

SpkA<SpkB
20 nm≤SpkA≤100 nm
80 nm≤SpkB≤150 nm
where,
SpkA: Projecting mountain part height of surface A
SpkB: Projecting mountain part height of surface B.

Spk is a kind of functional parameter defined by ISO 25178, and indicates the average height of a part (projecting mountain part) higher than the intersection of the equivalent straight line of the bearing curve of the height data and the straight line of the load area ratio=0%. Here, the bearing curve of the height data is obtained by accumulating the frequency at a certain height from the higher side and representing the total number of the entire height data as a percentage with 100%, and the load area ratio at a certain height C is given by Smr (C). In addition, the equivalent straight line has the smallest inclination among straight lines having a difference in the load area ratio (Smr) of 40%.

In the polypropylene film of the present invention, SpkA is more preferably 30 nm or more and still more preferably 40 nm or more. In addition, SpkA is more preferably 90 nm or less and still more preferably 80 nm or less.

In the polypropylene film of the present invention, SpkB is more preferably 90 nm or more and still more preferably 100 nm or more. In addition, SpkB is more preferably 140 nm or less and still more preferably 130 nm or less.

By satisfying SpkA and SpkB the above-mentioned ranges, sufficient lubricity can be obtained because the surface projection height of the film is sufficiently large, so that processability at the time of producing a capacitor element is excellent, excessively high projections is suppressed, and a decrease in withstand voltage of the capacitor is prevented.

SpkA and SpkB can be controlled to fall within the above-described range by, for example, using the polypropylene raw material B having preferable characteristics to be described later, setting the area stretching ratio to 60 times or more and preferably 65 times or more during biaxial stretching and the stretching ratio in the transverse direction to 11 times or more, and controlling the casting drum temperature, the melting peak temperature (Tm) and the crystallization peak temperature (Tc) of the film to fall within preferable ranges.

In the polypropylene film of the present invention, the arithmetic mean height (Sa) defined by ISO 25178 on at least one surface of the film is preferably 35 nm or more and 100 nm or less. By setting Sa to 35 nm or more, more preferably 40 nm or more, slippage of the film is moderately maintained, handleability is excellent, generation of wrinkles is suppressed, and element processability is excellent. On the other hand, by setting Sa to 100 nm or less, more preferably 75 nm or less, and still more preferably 60 nm or less, a high withstand voltage can be effectively obtained. From the above viewpoint, it is preferable that Sa is 35 nm or more and 100 nm or less, or in the above preferable range, on the surface having the smaller Sa of both surfaces.

The Sa of the polypropylene film of the present invention can be controlled to fall within the above-described range by, for example, using the polypropylene raw material B and/or the polypropylene raw material C as the polypropylene raw material A having preferable characteristics to be described later, setting the area stretching ratio to 60 times or more and preferably 65 times or more during biaxial stretching and the stretching ratio in the transverse direction to 11.0 times or more, and controlling the casting drum temperature, the melting peak temperature (Tm) (° C.) and the crystallization peak temperature (Tc) (° C.) of the film to fall within preferable ranges.

In the polypropylene film of the present invention, the total volume obtained by adding up the volumes of valleys having a depth of 20 nm or more in a region of 0.561 mm×0.561 mm measured by a scanning white interference microscope on at least one surface is preferably 50 $\mu m^3$ or more and 5,000 $\mu m^3$ or less. By setting the total volume to 50 $\mu m^3$ or more, more preferably 100 $\mu m^3$ or more, and still more preferably 500 $\mu m^3$ or more, the film moderately has irregularities on the surface, the handleability is improved by moderate slippage of the film, and the occurrence of wrinkles is reduced and the element processability is improved. In addition, even when the film is used as a capacitor for a long time, an increase in capacitance change due to the influence of wrinkles or the like is suppressed, or even when the film is laminated to form a capacitor, an appropriate gap is provided between the films, so that a self-healing function (self-healing) works to improve the reliability of the capacitor. On the other hand, by setting the total volume of valleys to 5,000 $\mu m^3$ or less, preferably 4,000 $\mu m^3$ or less, more preferably 3,500 $\mu m^3$ or less, and particularly preferably 3,000 $\mu m^3$ or less, it is possible to suppress the occurrence of breakdown due to formation of a locally thin portion. Therefore, the voltage resistance of the film is improved, and the voltage resistance and reliability under a high temperature environment can be improved even when the film is used for a high-voltage capacitor.

The total volume of the valleys of the film surface can be allowed to fall within the above-described preferable range by, for example, using the polypropylene raw material B to be described later, setting the area stretching ratio to 60 times or more and preferably 65 times or more during biaxial stretching and the stretching ratio in the transverse direction to 11.0 times or more, and controlling the casting drum temperature, the melting peak temperature (Tm) and the crystallization peak temperature (Tc) of the film to fall within preferable ranges.

The polypropylene film of the present invention preferably has a coefficient of static friction ($\mu_s$) of 0.3 or more and 1.5 or less when surfaces on the same side are overlapped with each other for at least one side surface, from the viewpoint of imparting moderate lubricity and enhancing the processability at the time of producing a capacitor element. By setting the coefficient of static friction us to 0.3 or more, more preferably 0.4 or more, and still more preferably 0.5 or more, it is possible to prevent occurrence of winding deviation during winding or element processing during film formation due to excessive slippage of the film. On the other hand, by setting the coefficient of static friction us to 1.5 or less, more preferably 1.0 or less, and still more preferably 0.8 or less, an extreme decrease in the slippage of the film can be suppressed, so that occurrence of wrinkles can be suppressed, and handleability and element processability can be further improved.

The polypropylene film of the present invention preferably has a meso-pentad fraction of 0.970 or more as measured by a nuclear magnetic resonance method (NMR method). The meso-pentad fraction is an index indicating stereoregularity of a crystal phase of polypropylene, and when the meso-pentad fraction is 0.970 or more, more preferably 0.975 or more, still more preferably 0.981 or more, the degree of crystallinity is high, the melting point is high, and the breakdown voltage under a high temperature environment can be improved. The upper limit of the meso-pentad fraction is not particularly limited.

According to the present invention, the polypropylene resin with a high meso-pentad fraction is preferably, in particular, a resin produced with a Ziegler-Natta catalyst, and a method such as appropriately selecting an electron-donating component in the catalyst is preferably employed. Thus, the polypropylene resin can be adapted to have a molecular weight distribution (Mw/Mn) of 3.0 or more, and a<2, 1>erythro site defect of 0.1 mol % or less, and it is preferable to use such a polypropylene resin.

In the polypropylene film of the present invention, when the polypropylene film is completely dissolved with xylene and then precipitated at room temperature, the polypropylene component (CXS, also referred to as a cold xylene soluble component) dissolved in xylene is preferably 3.0% by mass or less. Here, the CXS is considered to correspond to a component that is difficult to crystallize due to low stereoregularity, low molecular weight, or the like. By setting the CXS to 3.0% by mass or less, more preferably 1.5% by mass or less, still more preferably 1.3% by mass or less, particularly preferably 1.1% by mass or less, and most preferably 0.9% by mass or less, the heat resistance, the voltage resistance at high temperature, or the breakdown voltage of the film can be increased. Therefore, when used in a capacitor, relaxation under a high temperature environment is suppressed, thermal dimensional stability is improved, and leakage current can be suppressed. The lower limit of the CXS is not particularly limited and is practically 0.1% by mass. If the CXS is to be less than 0.1% by mass, the stretchability during film formation may be deteriorated to cause breakage.

In order to set the content of CXS within the above range, it is possible to use methods such as a method of increasing the catalytic activity for obtaining the polypropylene resin to be used, and a method of washing the obtained polypropylene resin with a solvent or the propylene monomer itself.

The polypropylene film of the present invention preferably has a breakdown voltage of 350 V/μm or more at 130° C. When the breakdown voltage is set to 350 V/μm or more, more preferably 375 V/μm or more, still more preferably 400 V/μm or more, and even more preferably 420 V/μm or more, short-circuit breakdown hardly occurs particularly when the film is used for a long time in a high temperature environment as a capacitor, and thus the voltage resistance is maintained and high reliability can be obtained. The upper limit of the breakdown voltage at 130° C. is not particularly limited, and is about 800 V/μm.

The film breakdown voltage at 130° C. can be controlled to fall within the above-described range in such a manner that, as described later, for example, a raw material having a high meso-pentad fraction and a cold xylene soluble component (CXS) of less than 3.0% by mass is used as the polypropylene raw material A, preliminary stretching to 1.01 to 1.10 times is performed before stretching in the machine direction, an area stretching ratio is set to 65 times or more during biaxial stretching and a stretching ratio in the transverse direction is set to 11.0 times or more, and in heat fixation treatment and relaxation treatment steps after the biaxial stretching, first, a relaxation treatment is performed while heat treatment (first stage) at a temperature lower than the stretching temperature in the transverse direction is performed, and subsequently, the film is appropriately subjected to a multi-stage heat fixation treatment and a relaxation treatment in which a heat treatment (second stage) is performed at a temperature lower than the first stage heat treatment temperature and 135° C. or higher, and a heat treatment (third stage) is further performed at 80° C. or higher and lower than the second stage heat treatment temperature while maintaining tension in the transverse direction.

The polypropylene film of the present invention is preferably surface-treated. A polypropylene film is generally low in surface energy, and is difficult to be stably subjected to metal vapor deposition. Therefore, for the purpose of improving adhesion to the metal layer, it is preferable to perform surface treatment before vapor deposition. Specific examples of the surface treatment include a corona discharge treatment, a plasma treatment, a glow treatment, and a flame treatment.

Usually, a surface wet tension of the polypropylene film is about 30 mN/m, but by these surface treatments, in the polypropylene film of the present invention, it is preferable to set the wet tension to preferably 37 to 75 mN/m, more preferably 39 to 65 mN/m, and still more preferably about 41 to 55 mN/m because the adhesion to the metal layer is excellent and security as the capacitor is also good.

The polypropylene film of the present invention preferably has a film thickness of 0.5 μm or more and less than 25 μm. By setting the film thickness to 0.5 μm or more and less than 25 μm, more preferably 0.6 μm or more and 6 μm or less, still more preferably 0.8 μm or more and 4 μm or less, and even more preferably 1 μm or more and 2.5 μm or less, a balance between withstand voltage characteristics under a high temperature environment and downsizing of a capacitor size due to thinning is excellent, and the film is particularly suitable for a thin film heat-resistant film capacitor required for automobile applications (including hybrid car applications) and the like used under a high-temperature environment.

The film thickness can be adjusted by, for example, adjusting an extrusion discharge amount, a rotation speed of a casting drum, a lip gap of a spinneret, and a stretching ratio. More specifically, the amount can be reduced by reducing the extrusion discharge amount, increasing the rotation speed of the casting drum, narrowing the lip gap of the spinneret, increasing the stretching ratio, and the like. These methods can be used in combination as appropriate.

The polypropylene film of the present invention is preferably in the form of a monolayer film and may be in the form of a laminated film.

The polypropylene film of the present invention is preferably used as a dielectric film for a capacitor, but various types of capacitors can be used. Specifically, from the viewpoint of the electrode configuration, it may be either a combined winding capacitor of a metal foil and a film or a vapor deposited metal film capacitor and is also preferably used for an oil-impregnated capacitor impregnated with an insulating oil or a dry capacitor that does not use an insulating oil at all. From the viewpoint of taking advantage of the characteristics of the film of the present invention, the film is particularly preferably used as a vapor deposited metal film capacitor. The shape of the film in the capacitor may be a wound type or a laminated type.

Next, a method for producing the polypropylene film of the present invention will be described as an example.

Next, raw materials preferably used for polypropylene film of the present invention will be described. As described above, in order to obtain the polypropylene film of the present invention, it is preferable to use a plurality of kinds of polypropylene raw materials, particularly polypropylene raw materials having different number average molecular weights.

The polypropylene raw material A is a linear polypropylene, and refers to one having a smaller number average molecular weight (Mn) than the polypropylene raw material B described later. The Mn of the polypropylene raw material A is preferably 30,000 ($3.0 \times 10^4$) or more, more preferably 40,000 ($4.0 \times 10^4$) or more, still more preferably 50,000 ($5.0 \times 10^4$) or more from the viewpoint of biaxially stretching the film. The Mn of the polypropylene raw material A is preferably 90,000 ($9.0 \times 10^4$) or less, more preferably 80,000 ($8.0 \times 10^4$) or less from the viewpoint of obtaining thermal stability in a high temperature environment.

The Z+1 average molecular weight ($M_{z+1}$) of the polypropylene raw material A is preferably 1.0 million ($1.0 \times 10^6$) or more, more preferably 1.5 million ($1.5 \times 10^6$) or more from the viewpoint of biaxially stretching the film. The $M_{z+1}$ of the polypropylene raw material A is preferably 2.5 million ($2.5 \times 10^6$) or less, more preferably 2.0 million ($2.0 \times 10^6$) or less from the viewpoint of obtaining thermal stability in a high temperature environment.

The polypropylene raw material A preferably has a cold xylene soluble component (hereinafter referred to as a CXS) of 3% by mass or less. By setting the CXS to 3.0% by mass or less, more preferably 2.0% by mass or less, still more preferably 1.5% by mass or less, and even more preferably 1.0% by mass or less, the film formation stability is excellent, and the strength, dimensional stability, and heat resistance of the film are improved. The CXS is preferably as low as possible, but the lower limit is about 0.1% by mass.

To control the content of CXS within such a range, it is possible to employ a method of enhancing the catalyst activity in obtaining a resin or a method of washing the obtained resin with a solvent or an olefin monomer itself.

The polypropylene raw material A preferably has a meso-pentad fraction of 0.970 or more. The meso-pentad fraction is an index indicating stereoregularity of a crystal phase of polypropylene as measured by a nuclear magnetic resonance method (NMR method), and when the meso-pentad fraction is 0.970 or more, more preferably 0.975 or more, still more preferably 0.980 or more, even more preferably 0.983 or more, the degree of crystallinity and the melting point are high, so that the meso-pentad fraction is suitable for use at a high temperature. The upper limit of the meso-pentad fraction is not particularly limited.

In order to obtain a polypropylene resin having high meso-pentad fraction, for example, a method of washing the obtained resin powder with a solvent such as n-heptane and a method of appropriately selecting a catalyst and/or a cocatalyst or composition is preferably adopted.

The melting point (meaning the melting point of the resin. The same applies hereinafter.) of the chip of the polypropylene raw material A is preferably 160° C. or higher. By setting the melting point of the chip to 160° C. or higher, more preferably 163° C. or higher, and still more preferably 166° C. or higher, it is possible to effectively obtain withstand voltage characteristics under a high temperature environment when the chip is used as a film.

The chip melting point is a melting peak temperature obtained when the chip is heated from 30° C. to 260° C. at 20° C./min with a differential scanning calorimetry DSC. There is a case where two or more melting peak temperatures are observed within the temperature range or a case of a peak temperature that can be observed on a multi-stage DSC chart referred to as a shoulder (observed in the case of a chart with two or more peaks overlapped with each other), but in the present invention, the temperature of a peak with the largest absolute value of vertical axis heat flow (unit: mW) on a DSC chart is regarded as the chip melting point.

As the ratio of the polypropylene raw material A in the raw material of the polyolefin film of the present invention, it is preferable that the polypropylene raw material A is the main component, that is, the largest amount, with respect to the polyolefin film.

The raw material of the polyolefin film of the present invention preferably contains a polypropylene raw material B having a number average molecular weight (Mn) larger than that of the polypropylene raw material A, in addition to the polypropylene raw material A, from the viewpoint of effectively obtaining withstand voltage characteristics under a high temperature environment when used as a film.

The number average molecular weight (Mn) of the polypropylene raw material B is preferably 50,000 ($5.0 \times 10^4$) or more, more preferably 60,000 ($6.0 \times 10^4$) or more, still more preferably 70,000 ($7.0 \times 10^4$) or more from the viewpoint of biaxially stretching the film. On the other hand, Mn of the polypropylene raw material B is preferably 120,000 ($12.0 \times 10^4$) or less, more preferably 110,000 ($11.0 \times 10^4$) or less, and still 100,000 ($10.0 \times 10^4$) or less from the viewpoint of obtaining thermal stability in a high temperature environment of the film.

The Mn of the polypropylene raw material B is larger than the Mn of the polypropylene raw material A, preferably 10,000 ($1.0 \times 10^4$) or more, and more preferably 20,000 ($2.0 \times 10^4$) or more.

Z+1 average molecular weight ($M_{z+1}$) of the polypropylene raw material B is preferably 2.5 million ($2.5 \times 10^6$) or more, more preferably 3.5 million ($3.5 \times 10^6$) or more, still more preferably 4.0 million ($4.0 \times 10^6$) or more, and even more preferably 4.5 million ($4.5 \times 10^6$) or more from the viewpoint of biaxially stretching the film. On the other hand, from the viewpoint of obtaining thermal stability of the film in a high temperature environment, $M_{z+1}$ of the polypropylene raw material B is preferably 8.0 million ($8.0 \times 10^6$) or less, and more preferably 7.0 million ($7.0 \times 10^6$) or less.

From the viewpoint of obtaining thermal stability of the film in a high temperature environment, $M_{z+1}$ of the polypropylene raw material B is preferably larger than the average molecular weight of $M_{z+1}$ of the polypropylene raw material A, more preferably 500,000 ($0.5 \times 10^6$) or more, still more preferably 1.0 million ($1.0 \times 10^6$) or more, and even more preferably 1.5 million ($1.5 \times 10^6$) or more.

In the polypropylene raw material B, the content of a cold xylene soluble component (CXS) is preferably 4.0% by mass or less. By setting the content of CXS in the polypropylene raw material B is 4.0% by mass or less, more preferably 3.0% by mass or less, the film formation stability is excellent, and the strength of the film is improved, and dimensional stability and heat resistance are also improved. The CXS is preferably as low as possible, but the lower limit is about 0.1% by mass.

To control the content of CXS within such a range, it is possible to employ a method of enhancing the catalyst activity in obtaining a resin or a method of washing the obtained resin with a solvent or an olefin monomer itself.

The polypropylene raw material B preferably has a meso-pentad fraction of 0.940 or more, more preferably 0.95 or more, still more preferably 0.960 or more.

The melting point of the chip of the polypropylene raw material B is preferably 160° C. or higher. By setting the melting point of the chip to 160° C. or higher, more preferably 162° C. or higher, and still more preferably 164° C. or higher, it is possible to effectively enhance the withstand voltage characteristics under a high temperature environment when the chip is used as a film.

The content of the polypropylene resin B in the raw material of the polypropylene film of the present invention is preferably 1% by mass or more and 30% by mass or less with respect to 100% by mass of the polypropylene film. The content of the polypropylene raw material B is more preferably 2% by mass or more. In addition, the content of the polypropylene raw material B is more preferably 25% by mass or less, still more preferably 20% by mass or less. The number average molecular weight (Mn), the Z+1 average molecular weight ($M_{z+1}$), the cold xylene soluble component (CXS), the meso-pentad fraction, the chip melting point, and the content of the polypropylene raw material B are set within the above-described preferable ranges, preliminary stretching to 1.01 to 1.10 times is performed in the machine direction before stretching, an area stretching ratio is set to 65 times or more during biaxial stretching and a stretching ratio in the transverse direction is set to 11.0 times or more, and in heat fixation treatment and relaxation treatment steps after the biaxial stretching, first, a relaxation treatment is performed while heat treatment (first stage) at a temperature lower than the stretching temperature in the transverse direction is performed, and subsequently, the film is appropriately subjected to a multi-stage heat fixation treatment and a relaxation treatment in which a heat treatment (second stage) is performed at a temperature lower than the first stage heat treatment temperature and 135° C. or higher, and a heat treatment (third stage) is further performed at 80° C. or higher and lower than the second stage heat treatment temperature while maintaining tension in the transverse direction, whereby appropriate protrusions are formed on the surface due to a difference in viscosity from the polypropylene raw material A, and the number of tie molecules connecting crystals is further increased, so that the orientation of molecular chains is easily increased when the stretching ratio is increased, and the binding force of amorphous chains under a high temperature environment can be increased.

The polyolefin film of the present invention may contain a branched polypropylene raw material C in addition to the polypropylene raw material A and the polypropylene raw material B.

The polypropylene raw materials C produced by using a plurality of production methods, for example, ones produced with a Ziegler-Natta catalyst system and a metallocene catalyst system are produced, and the metallocene catalyst system that provides a small amount of low molecular weight components and high molecular weight components and a narrow molecular weight distribution is more preferable from the viewpoint of use in combination with the polypropylene raw material A and the polypropylene raw material B.

Specifically, as commercially available products of the polypropylene raw material C, a commercially available product of "Profax" (registered trademark) (PF-814 and the like) available from LyondellBasell Industries N.V., and as a metallocene catalyst system, "Daploy" (trademark) (WB130HMS, WB135HMS, WB140HMS, and the like) available from Borealis AG, and "WAYMAX" (registered trademark) (MFX8, MFX6, MFX3, and the like) available from Japan Polypropylene Corporation can be appropriately selected and used.

In the polypropylene raw material C, the CXS is preferably 5.0% by mass or less, and more preferably 3.0% by mass or less. The CXS is preferably as low as possible, but the lower limit is about 0.1% by mass. To control the CXS within such a range, it is possible to employ a method of enhancing the catalyst activity in obtaining a resin or a method of washing the obtained resin with a solvent or an olefin monomer itself.

The melt tension of the polypropylene raw material C at 230° C. is preferably 2 cN or more and 40 cN or less from the viewpoint of stretching uniformity. The melt tension is more preferably 3 cN or more, and still more preferably 5 cN or more. In addition, it is more preferably 30 cN or less and still more preferably 20 cN or less. In order to set the melt tension of the polypropylene raw material C to fall in the above range, a method for controlling the average molecular weight, the molecular weight distribution, and the degree of branching in the polypropylene raw material or the like can be employed.

The content of the polypropylene resin C in the raw material of the polypropylene film of the present invention is preferably 0.10% by mass or more with respect to 100% by mass of the polypropylene film. The content of the polypropylene raw material C is more preferably 0.15% by mass or more, still more preferably 0.20% by mass or more, and even more preferably 0.50% by mass or more. In addition, the content of the polypropylene raw material C is preferably 10% by mass or less, more preferably 4.5% by mass or less, and still more preferably 3.0% by mass or less. When the content of the polypropylene resin C is within the above range, the spherulite size can be prevented from becoming too large when the molten polymer is formed into a sheet shape, and the high-temperature withstand voltage can be maintained.

Hereinafter, the method for producing the polypropylene film according to embodiments of the present invention will be described more specifically using the above described raw materials, but the present invention is not necessarily interpreted to be limited thereto.

The polypropylene resin as described above can be melt-extruded onto a support to form an unstretched polypropylene film.

The polypropylene raw material is melt-extruded from a single screw extruder set at an extrusion temperature of preferably 220° C. or higher and 280° C. or lower, more preferably 230° C. or higher and 270° C. or lower, passed through a filtration filter, and then extruded from a slit-shaped spinneret at a temperature of preferably 200° C. or higher and 260° C. or lower, and more preferably 210° C. or higher and 240° C. or lower. The molten sheet extruded from the slit-shaped spinneret is solidified on a casting drum (cooling drum) controlled at a temperature of 30° C. or higher and 110° C. or lower to obtain an unstretched polypropylene film. As a method for bringing the molten sheet into close contact with a casting drum, any one of an electrostatic application method, an adhesion method using the surface tension of water, an air knife method, a press roll method, an underwater casting method, an air chamber method, and the like may be used, but an air knife method having good flatness and capable of controlling surface roughness is preferable. In addition, in order not to cause vibration of the film, it is preferable to appropriately adjust the position of the air knife so that the air flows to the downstream side of the film formation. The temperature of the casting drum is more preferably 60° C. or higher and 110° C. or lower, still more preferably 80° C. or higher and 110° C. or lower from the viewpoint of improving the element processability and improving the voltage resistance by having a small surface recess and moderate lubricity when used as a film.

A biaxially oriented polypropylene film can be obtained by subjecting an unstretched polypropylene film to biaxial stretching, heat treatment, and relaxation treatment.

As a method of the biaxial stretching, any of an inflation simultaneous biaxial stretching method, a tenter simultaneous biaxial stretching method, and a tenter sequential biaxial stretching method can be employed, and among them, a tenter sequential biaxial stretching method is preferably employed in terms of controlling the film formation stability, a crystalline/amorphous structure, and the surface characteristics, particularly the mechanical characteristics and thermal dimensional stability while increasing the stretching ratio in the transverse direction of the present invention. This unstretched polypropylene film is stretched in the machine direction and then stretched in the transverse direction to be sequentially biaxially stretched.

It is preferable to perform multi-stage stretching of preliminary stretching and main stretching in the longitudinal stretching step. The unstretched polypropylene film is preheated by being passed between rolls preferably kept at 70° C. or higher and 150° C. or lower, more preferably at 80° C. or higher and 145° C. or lower, and subjected to preliminary stretching to 1.01 times or more and 1.10 times or less in the machine direction. As a result, the spherulite breakage of the unstretched sheet proceeds moderately, and the molecular chains are preoriented, so that the crystallite size, the crystal orientation and the restriction of the amorphous chains of the stretched film obtained after the subsequent main stretching can be further enhanced. Therefore, the withstand voltage of the film can be improved, and a stable structure can be obtained even in a high temperature environment.

Subsequently, the polypropylene film preliminarily stretched in the machine direction between rollers maintained at a temperature of preferably 70° C. or higher and 150° C. or lower, more preferably 80° C. or higher and 145° C. or lower, subjected to main stretching in the machine direction to preferably 2.0 times or more and 15.0 times or more, more preferably 4.5 times or more and 12.0 times or more, still more preferably 5.5 times or more and 10.0 times or more, and then cooled to room temperature.

Next, the film is guided to a tenter while both ends of the film in the transverse direction uniaxially stretched in the machine direction are held by a clip. Here, in the present invention, when the temperature of the preheating step immediately before stretching in the transverse direction is preferably set to the stretching temperature in the transverse direction +5° C. to +15° C., more preferably +5° C. to +12° C., and still more preferably +5° C. to +10° C. The reason for this is that fibril structure highly oriented in the machine direction by uniaxial stretching can be further enhanced, and the change in the breakdown voltage before and after heating the film can be suppressed. In addition, it is also preferable to set the temperature conditions as described above from the viewpoint that the thermal dimensional stability can be improved by stabilizing a molecular chain having insufficient orientation by high temperature preheating after uniaxial stretching. By setting the preheating temperature to the stretching temperature +5° C. or higher, a change in breakdown voltage before and after heating of the film can be suppressed, and thermal dimensional stability can be effectively improved. On the other hand, by setting the preheating temperature to the stretching temperature +15° C. or lower, the film can be suppressed from being broken in the stretching step.

Next, the film is stretched in the transverse direction while the end of the film is held by the clip. The temperature (stretching temperature in transverse direction) at that time is preferably 150° C. or higher and 170° C. or lower, and more preferably 155° C. or higher and 165° C. or lower.

From the viewpoint of suppressing the change in the dielectric breakdown voltage before and after heating the film, the stretching ratio in the transverse direction is 11.0 times or more and 20.0 times or more. By setting the stretching ratio in the transverse direction to 11.0 times or more, more preferably 11.5 times or more, and still more preferably 12.0 times or more, the orientation distribution of the fibril structure highly oriented in the machine direction by uniaxial stretching is reduced, and the change in the breakdown voltage before and after film heating can be suppressed. It is preferable to increase the stretching ratio in the transverse direction because the orientation in the transverse direction is imparted while a high orientation state in the machine direction is maintained, so that in-plane molecular chain tension is increased, and further, the structural stability against heat can be also improved. Therefore, it is preferable to set the stretching ratio in the transverse direction as described above from the viewpoint of obtaining the effect of improving the thermal shrinkage characteristics that is a trade-off. On the other hand, by setting the stretching ratio in the transverse direction to 20.0 times or less, more preferably 19.0 times or less, and still more preferably 18.0 times or less, film breakage during film formation can be reduced.

In the production of the polypropylene film of the present invention, the area stretching ratio is preferably 65 times or more. The area stretching ratio is obtained by multiplying the stretching ratio in the machine direction by the stretching ratio in the transverse direction. Here, by setting the area stretching ratio to 65 times or more, more preferably 66 times or more, still more preferably 68 times or more, and even more preferably 72 times or more, it is possible to suppress a change in the dielectric breakdown voltage before and after heating the film and make the film excellent in the long-term use reliability in high temperature environments when used as a capacitor.

In the production of the polypropylene film of the present invention, in the subsequent heat treatment and relaxation treatment steps, it is preferable that heat fixation (heat treatment at first stage) be performed at a temperature (heat treatment temperature at first stage) of 145° C. or higher and 165° C. or lower and lower than the stretching temperature in the transverse direction while giving 2% or more and 20% or less of relaxation in the transverse direction while tensely gripping the film in the transverse direction with a clip and heat treatment (heat treatment at second stage) be performed again at a temperature of 135° C. or higher and lower than the heat fixation temperature (heat treatment temperature at first stage) while tensely gripping the film in the transverse direction with a clip, and a multi-stage heat treatment in which heat fixation (heat treatment at third stage) is performed at a temperature of 80° C. or higher and lower than the heat fixation temperature (heat treatment temperature at second stage) while tensely gripping the film is further performed, from the viewpoint that change in the breakdown voltage before and after heating is suppressed, the structural stability against heat is improved, and the voltage resistance and reliability can be obtained when used as a capacitor.

In the relaxation treatment, the relaxation ratio is preferably 2% or more and 20% or less from the viewpoint of enhancing the structural stability against heat. By setting the relaxation ratio to 20% or less, more preferably 18% or less, and still more preferably 15% or less, it is possible to prevent the film from being excessively slack inside the tenter, causing wrinkles in the product, and causing unevenness during vapor deposition. It is also possible to prevent deterioration of the mechanical properties. On the other hand, by setting the relaxation ratio to 2% or more, more preferably 5% or more, and still more preferably 8% or more, structural stability against heat is obtained, and it is possible to prevent capacitance reduction and short-circuit breakdown under a high temperature environment when used as a capacitor.

After the heat treatment for lowering the temperature in multiple stages, the film is guided to the outside of the tenter, the clip at the film end in the transverse direction is released in a room temperature atmosphere, the film edge is slit in a winder step, and a film product roll having a film thickness of 0.5 μm or more and less than 10 μm is wound up. Here, in order to improve the adhesion of a vapor-deposited metal on a surface subjected to vapor deposition before winding the film, it is preferable to perform a corona discharge treatment in air, nitrogen, carbon dioxide, or a mixed gas thereof.

In order to obtain the polypropylene film of the present invention, specific examples of the intended preferable production conditions are as follows.

The melt extrusion temperature should be lowered in multiple stages before and after the filter and at the spinneret.

The meso-pentad fraction of the polypropylene resin A is 0.970 or more.

The CXS of the polypropylene resin A is less than 3.0% by mass.

Preliminary stretching to 1.01 times or more and 1.10 times or less is performed before longitudinal stretching.

The area stretching ratio of stretching is 65 times or more.
The stretching ratio in the transverse direction is 11.0 times or more.

The preheating temperature before stretching in the transverse direction is the stretching temperature in the transverse direction+5 to +15° C.

The heat treatment temperature at the first stage is 145° C. or higher and 165° C. or lower and lower than the stretching temperature in the transverse direction.

The heat treatment temperature at the second stage is 135° C. or higher and lower than the heat treatment temperature at the first stage.

The heat treatment temperature at the third stage is 80° C. or higher and lower than the heat treatment temperature at the second stage.

2% or more and 20% or less of relaxation treatment is performed in the transverse direction in the heat treatment step at the first stage.

Subsequently, a metal layer laminated film obtained using the polypropylene film of the present invention, a film capacitor obtained using the metal layer laminated film, and a method for producing the metal layer laminated film and the film capacitor will be described.

The metal layer laminated film according to embodiments of the present invention has a metal layer on at least one surface of the polypropylene film of the present invention. This metal layer laminated film can be obtained by providing a metal layer on at least one surface of the polypropylene film according to embodiments of the present invention.

In the present invention, the method for giving a metal layer is not particularly limited, and for example, a method is preferably used in which aluminum or an alloy of aluminum and zinc is vapor-deposited on at least one surface of a polypropylene film to provide a metal layer such as a vapor deposited film serving as an internal electrode of a film capacitor. At this time, other metal components such as nickel, copper, gold, silver, and chromium can be vapor-deposited simultaneously or sequentially with aluminum. A protective layer can also be provided on the vapor deposited film with oil or the like. When the surface roughness of the polypropylene film is different between the front and back surfaces, it is preferable to provide a metal layer on the surface side having a smooth roughness to form a metal layer laminated film from the viewpoint of enhancing the voltage resistance.

In the present invention, if necessary, after the metal layer is formed, the metal layer laminated film can be subjected to an annealing treatment or a heat treatment at a specific temperature. For insulation or other purposes, at least one surface of the metal layer laminated film may be coated with a resin such as polyphenylene oxide.

The film capacitor according to embodiments of the present invention is formed using the metal layer laminated film according to embodiments of the present invention. That is, the film capacitor of the present invention has the metal layer laminated film according to embodiments of the present invention.

For example, the film capacitor of the present invention can be obtained by laminating or winding the metal layer laminated film of the present invention described above by various methods. A preferable method for producing a wound film capacitor is as follows.

Aluminum is vapor-deposited on one surface of the polypropylene film under reduced pressure. At that time, vapor deposition is performed in a stripe shape having a margin portion running in the machine direction. Next, slits are made with a blade at the center of each vapor deposition portion and the center of each margin portion on the surface to produce a tape-shaped winding reel having a margin on one side of the surface. Two tape-shaped winding reels respectively having a left margin and a right margin are overlapped and wound such that the vapor deposition portion protrudes from the margin portion in the transverse direction to obtain a wound body.

When both surfaces of the film are subjected to vapor deposition, aluminum is vapor-deposited in a stripe pattern having margins running in the machine direction on one surface, and aluminum is vapor-deposited on the other surface in a stripe pattern so that margins in the machine direction are positioned at the center of the vapor deposition portion on the back surface. Next, slits are made with a blade at the center of each margin portion on the front and back surfaces to produce a tape-shaped winding reel having a margin on one side (for example, if there is a margin on the front right side, a margin is on the left side on back side) on both surfaces. Two sheets including one of the obtained reel and one of the undeposited laminated film are overlapped and wound so that the metallized film protrudes from the laminated film in the transverse direction to obtain a wound body.

A wound film capacitor can be obtained by removing a core material from the wound body produced as described above, pressing the wound body, performing metal spraying on both end surfaces to form external electrodes, and welding a lead wire to the metal-sprayed portions. A film capacitor can be used in a wide variety of applications such as railway vehicles, automobiles (hybrid cars and electric vehicles), solar power generation/wind power generation, and general home appliances, and the film capacitor of the present invention can also be suitably used in these applications. In addition, the polypropylene film of the present invention can be preferably used in various applications such as a packaging film, a release film, a processing film, a sanitary product, an agricultural product, a building product, and a medical product, particularly in applications including a heating step in film processing.

As a second aspect of the polypropylene film of the present invention, it is also possible to provide a polypropylene film having a crystal orientation degree of the α crystal (110) plane of 0.73 or more when the film is heated at 125° C. for 60 minutes and measured by wide angle X-ray diffraction, and having a sum of a stress (F5MD) (MPa) at 5% elongation in the film machine direction when the film is heated at 150° C. for 10 minutes and a stress (F5TD) (MPa) at 5% elongation in the film transverse direction when the film is heated at 150° C. for 10 minutes and subjected to a tensile test at room temperature of 150 MP or more. The crystal orientation degree of the x crystal (110) plane when the film is heated at 125° C. for 60 minutes and measured by wide angle X-ray diffraction and the sum of a stress (F5MD) (MPa) at 5% elongation in the film machine direction when the film is heated at 150° C. for 10 minutes and a stress (F5TD) (MPa) at 5% elongation in the film transverse direction when the film is heated at 150° C. for 10 minutes and subjected to a tensile test at room temperature can be achieved in the same manner as the polypropylene film of the present invention described above, and a preferable range is also the same as the above.

Also in the second aspect of the polypropylene film of the present invention, Tm−Tc, skewness (Ssk), the amount of the polypropylene component (CXS) dissolved in xylene, SpkA, SpkB, the total valley side volume obtained by adding the volume of valleys having a depth of 20 nm or more in the region of 0.561×0.561 mm², the thermal shrinkage ratio in the transverse direction after heat treatment at 125° C. for 15 minutes, $\mu_s$, and the like are preferably in the above-described ranges, and the means for achieving the above are also the same as those described above. Further, in the second aspect of the polypropylene film of the present invention, a metal layer laminated film having a metal layer on at least one surface may be used, or the metal layer laminated film may be used as a film capacitor.

EXAMPLES

Hereinafter, the present invention will be described more specifically with reference to examples.
[Measurement and Evaluation Methods]
Measurement methods of characteristic values in the present invention and the methods for evaluating the effects are as follows.
(1) Film Thickness A thickness of a polypropylene film was measured at randomly selected 10 positions in an atmosphere of 23° C. and 65% RH using a contact type electronic micrometer (K-312A type) available from ANRITSU CORPORATION. An arithmetic average value of the thicknesses at 10 positions was taken as a film thickness of the polypropylene film.
(2) Difference in Crystallite Size Depending on Alignment Direction of a Crystal (110) Plane A polypropylene film was cut into strips each having a length of 4 cm and a width of 1 mm, and the strips were stacked so that the product would have a thickness of 1 mm to prepare a sample. The sample was placed between an X-ray source and a detector so that the X-ray was transmitted through the sample, an angle (2θ/θ) between the X-ray source and the detector was scanned symmetrically with respect to the film surface, and the X-ray diffraction was measured. The crystallite size (nm) (of Through-MD) obtained by scanning in the main alignment direction and the crystallite size (nm) (of Through-TD) obtained by scanning in the orthogonal direction of the main alignment direction were obtained from the half width βe of the crystal peak at 2θ=about 14° (α crystal (110) plane) in the scanning direction of each of the main alignment direction and the orthogonal direction using the following Equations (1) and (2), and the absolute value of the difference was taken as the difference (nm) in crystallite size depending on the alignment direction of the α crystal (110) plane.

$$\text{Crystallite size} = K\lambda/(\beta\cos\theta) \qquad \text{Equation (1)}$$

$$\beta = (\beta e^2 + \beta o^2)^{1/2} \qquad \text{Equation (2)}$$

Here,
  λ: X-ray wavelength (0.15418 nm),
  βe: Half-width of diffraction peak,
  βo: Correction value for half-width (0.6°,
  K: Scherrer constant (1.0)
(Measuring Apparatus)
  X-ray diffraction apparatus
  Model 4036 A2 available from Rigaku Denki Co., Ltd.
  X-ray source: CuKα ray (Ni filter was used)
  Output: 40 kV-30 mA
    Goniometer Model 2155D available from Rigaku Denki Co., Ltd.
  Slit: 2 mmφ-1°-1°
  Detector: Scintillation counter
    Counting recorder RAD-C available from Rigaku Denki Co., Ltd.

(Measurement conditions).
  Through-TD scan, Through-MD scan
  Scan method: Step scan
  Measuring range: (2θ)=5° to 60°
  Step: 0.05°
  Integration time: 2 seconds (3) Crystal Orientation Degree of a Crystal (110) Plane A polypropylene film was cut into strips each having a length of 4 cm and a width of 1 mm, and the strips were stacked so that the product would have a thickness of 1 mm to prepare a sample. A film sample was placed between an X-ray source and a detector so that X-rays were transmitted through the polypropylene film, the sample was irradiated with X-rays in a direction perpendicular to the film surface. From the half width H (') of the orientation peak obtained by scanning the crystal peak in 2θ=about 14° (α crystal (110) plane) in the circumferential direction, the crystal orientation degree was calculated according to the following equation.

Crystal orientation degree=(180°−H)/180°

The measuring apparatus and conditions are shown below.
(Measuring Apparatus).
  The same apparatus as in the above (2) was used.
(Measurement Conditions)
  Circumferential scanning (2θ=about) 14°
  Scan method: Step scan
  Measuring range: 0° to 360°
  Step: 0.5° Integration time: 2 seconds (4) Shrinkage Stress in Machine Direction at 135° C. (Sf 135 Md)

A polypropylene film was cut into a rectangular sample having a width of 4 mm and a length of 50 mm along the measurement direction (machine direction) of the film as a long side, and the film was pinched by a metal chuck so as to have a test length of 20 mm. The sample pinched by the chuck was set in the following apparatus, and the stress curve in the machine direction in the film whose test length was kept constant was obtained by the following temperature program. From the obtained stress curve, the value of the shrinkage stress at 135° C. (SF 135 MD) was read, and the average value obtained by measuring n=3 was taken as the shrinkage stress in the machine direction at 135° C. (unit: MPa).

Apparatus: Thermomechanical analyzer TMA/SS 6000 (available from Seiko Instruments Inc.)
  Test mode: L control mode
  Test length: 20 mm
  Temperature range: 23° C. to 200° C.
  Temperature elevation rate: 10° C./min
  Initial displacement: 0 μm
  SS program: 0.1 μm/min
  Measurement atmosphere: Nitrogen
  Measured thickness: The film thickness measured by the above (1) was used.

(5) Degree of Bias, or Skewness, (Ssk) of Protrusion Shape of Surface

The skewness (Ssk) is defined by ISO 25178.

Measurement was performed using a scanning white interference microscope VS1540 available from Hitachi High-Tech Science Corporation, the undulation component was removed from a shot image by polynomial fourth-order approximation surface correction with the use of attached analysis software, the image was processed with a median (3×3) filter, and interpolation processing, that is, processing of compensating for pixels for which height data fails to be acquired, with height data calculated from surrounding pixels was then performed. An average value obtained by performing measurement at randomly selected five positions in one plane was calculated. The measurement was performed on both surfaces of the film.

The measurement conditions were as follows.
  Manufacturer: Ryoka Systems Inc.
  Distributor: Hitachi High-Tech Science Corporation
  Apparatus name: Scanning white interference microscope VS1540
  Measurement conditions: Objective lens: x 10
  Lens barrel 1 x
  Zoom lens 1 x
  Wavelength filter: 530 nm white
  Measurement mode: Wave
  Measurement software: VS-Measure Version 10.0.4.0
  Analysis software: VS-Viewer Version 10.0.3.0
  Measurement area: 0.561 mm×0.561 mm (6) Meso-Pentad Fraction For a polypropylene resin in a case of a raw material and a film sample in a case of a film, each was powdered by freeze pulverization, extracted with n-heptane for 2 hours at 60° C. to remove impurities and additives in polypropylene, and then dried under reduced pressure for 2 hours or more at 130° C. The sample was dissolved in a solvent, and the meso-pentad fraction (mmmm) was obtained using 13C-NMR under the following conditions.

Measurement Conditions
  Apparatus: DRX-500 available from Bruker Corporation
  Measurement nucleus: 13C nucleus (resonance frequency: 125.8 MHZ).
  Measurement concentration: 10% by mass
  Solvent: benzene/deuterated ortho-dichlorobenzene=1:3 mixed solution (volume ratio)
  Measurement temperature: 130° C.
  Spin rotation number: 12 Hz
  NMR sample tube: 5 mm tube
  Pulse width: 45° (4.5 μs)
  Pulse repetition period: 10 seconds
  Data point: 64 K
  Number of integrations: 10,000 times
  Measurement mode: Complete decoupling Analysis was performed as follows. Fourier transformation was performed with an LB (line broadening factor) of 1, and the mmmm peak was set to 21.86 ppm. Peak splitting was performed using WINFIT software (available from Bruker Corporation). At that time, the peak splitting was performed from the peak on the high magnetic field side as follows, automatic fitting of the software was further performed to optimize the peak splitting, and then the total of the peak fractions of mmmm was set as the meso-pentad fraction (mmmm).

(1) mrrm
  (2) (3) rrrm (divided as two peaks)
  (4) rrrr
  (5) mrmr
  (6) mrmm+rmrr
  (7) mmrr
  (8) rmmr
  (9) mmmr
  (10) mmmm The same measurement was performed five times for the same sample, and the average value of the obtained meso-pentad fractions was set as the meso-pentad fraction of the sample.

(7) Melting Peak Temperature (Tm) and Crystallization Peak Temperature (Tc) of Polypropylene Resin and Film With the use of a differential scanning calorimetry (EXSTAR DSC6220 available from Seiko Instruments Inc.), 3 mg of the polypropylene film in a nitrogen atmosphere is heated from 30° C. to 260° C. under the condition of 20° C./min, then held at 260° C. for 5 minutes, and then cooled to 30° C. under the condition of 20° C./min. The endothermic peak temperature obtained in the heating process was defined as the melting peak temperature of the polypropylene film, and the exothermic peak temperature obtained in the cooling process was defined as the crystallization peak temperature of the polypropylene film. In the present specification, Tm and Tc were calculated from the average value obtained by measurement with n=3. There is a case where two or more peak temperatures are observed within the temperature range or a case of a peak temperature that can be observed on a multi-stage DSC chart referred to as a shoulder (observed in the case of a chart with two or more peaks overlapped with each other), but in the present invention, the temperatures of peaks with the largest absolute values of vertical axis heat flow (unit: mW) on a DSC chart are respectively regarded as Tm and Tc. (Tm) and (Tc) of the polypropylene resin were also measured in the same manner.

(8) Arithmetic Mean Height (Sa) at Surface in Film Surface

The arithmetic mean height (Sa) is defined by ISO 25178. Measurement was performed using a scanning white interference microscope VS1540 available from Hitachi High-Tech Science Corporation, the undulation component was removed from a shot image by polynomial fourth-order approximation surface correction with the use of attached analysis software, the image was processed with a median (3×3) filter, and interpolation processing (processing of compensating for pixels for which height data fails to be acquired, with height data calculated from surrounding pixels) was then performed. Sa was measured on both surfaces of the polypropylene film surface, and the value of the polypropylene film surface where a small value was obtained was shown in the table. The measurement conditions were the same as in the above (5) Degree of bias of surface protrusion.

(9) Projecting Mountain Part Height on Film Surface (SpkA) and (SpkB)

The projecting mountain part height (Spk) is defined by ISO 25178. Measurement was performed using a scanning white interference microscope VS1540 available from Hitachi High-Tech Science Corporation, the undulation component was removed from a shot image by polynomial fourth-order approximation surface correction with the use of attached analysis software, the image was processed with a median (3×3) filter, and interpolation processing (processing of compensating for pixels for which height data fails to be acquired, with height data calculated from surrounding pixels) was then performed. An average value obtained by performing measurement at five arbitrary positions in one plane was calculated. Measurement was performed on both surfaces of the film, and the value of the surface having a low value was defined as SpkA, and the value of the surface on the opposite side was defined as SpkB. The measurement conditions were the same as in the above (5) Degree of bias of surface protrusion.

(10) Breakdown Voltage (V/μm) at 130° C.

The film was heated for 1 minute in an oven maintained at 130° C. and then measured in that atmosphere according to Method B (flat plate electrode method) of JIS C 2330 (2014) 6.2 and JIS C 2151 (2019) 17.2 cited therein. However, as for the lower electrode, one obtained by placing Conductive Rubber (E-100<65>, available from TOGAWA RUBBER CO., LTD.) having the same dimensions on an aluminum foil described in JIS C 2151 (2019) 17.2.2 FIG. 3-C was used as an electrode. A breakdown voltage test was carried out 30 times. Each obtained value was divided by the thickness of the film (measured in above-described (1)) and converted into the unit of V/μm. From the measured values (calculated values) of 30 points in total, 5 points in descending order from the maximum value and 5 points in ascending order from the minimum value were excluded, and the average value of the remaining 20 points was taken as the film breakdown voltage at 130° C.

(11) Cold Xylene Soluble Component (CXS) of Film

For a polypropylene resin in a case of a raw material and a film sample in a case of a film, 0.5 g was dissolved in 100 ml of xylene at 135° C. and allowed to cool, and then left recrystallized in a thermostatic water bath for 1 hour at 20° C., and then the polypropylene-based component dissolved in a filtrate was quantified by liquid chromatography. Assuming that the amount of the polypropylene-based component dissolved in the filtrate was set as X (g) and the precise amount value of 0.5 g of the sample was set as $X_0$ (g), CXS was calculated by the following equation.

$$CXS(\% \text{ by mass})=(X/X_0)\times 100$$

(12) Crystal Orientation Degree of a Crystal (110) Plane after Heating

In a method for heat-treating a film for 60 minutes at 125° C., a square metal frame having a thickness of 2 mm, an outer dimension of 300 mm×300 mm, and a width of 20 mm that is hollowed out to an inner dimension of 280 mm×280 mm is used. Double-sided tapes ("NICE TACK" NW-H15 (trademark) adhesive force 02 available from Nichiban Co., Ltd.) are attached to four sides of the frame surface, the film is attached so that the film covers the entire surface of the metal frame, and the film is sandwiched between metal frames having the same dimensions. At this time, the film is attached so as not to be wrinkled. Next, in a state of metal frame/double-sided tape/film/metal frame, a sample in which four sides of the frame were sandwiched and fixed with clips was prepared, and the sample was left in an oven heated to 125° C. for 60 minutes. Thereafter, the sample was taken out and allowed to stand at room temperature for 5 minutes, and then the film was cut out along the inner frame of the metal frame to obtain a film after heat treatment at 125° C. A film after the heat treatment at 125° C. was cut into strips each having a length of 4 cm and a width of 1 mm, and the strips were stacked so that the product would have a thickness of 1 mm to prepare a sample. A film sample was placed between an X-ray source and a detector so that X-rays were transmitted through the polypropylene film, the sample was irradiated with X-rays in a direction perpendicular to the film surface. From the half width H (') of the orientation peak obtained by scanning the crystal peak in 2θ=about 14° (x crystal (110) plane) in the circumferential direction, the crystal orientation degree was calculated according to the following equation.

$$\text{Crystal orientation degree}=(180°-H)/180°$$

The measuring apparatus and conditions are shown below.

(Measuring Apparatus).
X-ray diffraction apparatus Model 4036 A2 available from Rigaku Denki Co., Ltd.
X-ray source: CuKα ray (Ni filter was used)
Output: 40 KV-30 mA
Goniometer Model 2155D available from Rigaku Denki Co., Ltd.
Slit: 2 mmφ–1°-1°
Detector: Scintillation counter Counting recorder RAD-C available from Rigaku Denki Co., Ltd.
(Measurement Conditions)
Circumferential scanning (2θ=about) 14°
Scan method: Step scan
Measuring range: 0° to 360°
Step: 0.5° Integration time: 2 seconds
(13) Stress (F5MD) at 5% Elongation in Film Machine Direction and Stress (F5TD) at 5% Elongation in Film Transverse Direction of Film after Heating In a method for heat-treating a film for 10 minutes at 150° C., a square metal frame having a thickness of 2 mm, an outer dimension of 300 mm×300 mm, and a width of 20 mm that is hollowed out to an inner dimension of 280 mm×280 mm is used. Double-sided tapes ("NICE TACK" NW-H15 (trademark) adhesive force 02 available from Nichiban Co., Ltd.) are attached to four sides of the frame surface, the film is attached so that the film covers the entire surface of the metal frame, and the film is sandwiched between metal frames having the same dimensions. At this time, the film is attached so as not to be wrinkled. Next, in a state of metal frame/double-sided tape/film/metal frame, a sample in which four sides of the frame were sandwiched and fixed with clips was prepared, and the sample was left in an oven heated to 150° C. for 10 minutes. Thereafter, the sample was taken out and allowed to stand at room temperature for 5 minutes, and then the film was cut out along the inner frame of the metal frame to obtain a film after heat treatment at 150° C. A film after the heat treatment at 150° C. was cut into a rectangle having a test direction length of 50 mm and a width of 10 mm to prepare a sample. Then, the sample was set on a tensile tester (Tensilon UCT-100 available from ORIENTEC CORPORATION) for a rectangular sample at an initial chuck distance of 20 mm, and a tensile test of the film was carried out at a tensile speed of 300 mm/min in 23° C. atmosphere. The load applied to the film when the elongation of the sample was 5% was read, and the value obtained by dividing the load by the cross sectional area (film thickness × width (10 mm)) of the sample before the test was calculated as the stress at 5% elongation (F5 value, unit: MPa). Measurements were made 5 times for each sample in the machine direction and the transverse direction, the average value was calculated, and F5MD and F5TD were calculated. The film thickness used in calculating the F5 value was the value measured in the above (1).

(14) Total Volume of Valleys at Depth of 20 nm or More in Film Surface

Measurement was performed using a scanning white interference microscope VS1540 available from Hitachi High-Tech Science Corporation, the undulation component was removed from a shot image by polynomial fourth-order approximation surface correction with the use of attached analysis software, the image was processed with a median (3×3) filter, and interpolation processing, that is, processing of compensating for pixels for which height data fails to be acquired, with height data calculated from surrounding pixels was then performed. Next, analysis was performed using a bearing function, which is an analysis tool of the analysis software. In order to designate a valley-side gap having a depth of 20 nm or more, the valley side height threshold was set to −20 nm in the height region designation. Next, the volume value of the valley that satisfied the threshold and was analyzed was read. Measurement was performed at 5 randomly selected regions of 0.561×0.561 mm$^2$ in one plane, and the average value of the total volume in the regions was taken as the total volume of valleys having a depth of 20 nm or more on the film surface.

When both surfaces of the film were measured and the total volume of valleys in one plane fell within the range of 50 to 5,000 μm$^3$, the value of the surface on the side that fell within the range, the value of the surface having a smaller value when both the surfaces are within the range was given, and when the total valley side volume did not fall within the range on both surfaces, the value of the surface on the side close to the range of 50 to 5,000 μm$^3$ was given. The measurement conditions were the same as in the above (5) Degree of bias of surface protrusion.

(15) Thermal Shrinkage Ratio HS125TD in Transverse Direction after Heat Treatment at 125° C. For 15 Minutes Cut out were 5 samples each having a length of 200 mm and a width of 10 mm such that the transverse direction of the film was the long side, each sample was marked to draw reference lines at positions of 25 mm from both ends, and the distance between the reference lines was measured with a universal projector and defined as a test length (L1). Next, a load of 3 g was applied to one end (the lower end) of the test piece in the length direction, the test piece was heated in a suspended state for 15 minutes in an oven maintained at 125° C., the test piece was taken out and cooled at room temperature, a dimension (L2) between the reference lines previously drawn was measured with a universal projector, the thermal shrinkage ratio HS125TD of each sample was determined by the following equation, and the arithmetic average value of 5 samples was calculated as the thermal shrinkage ratio HS125TD in the measurement direction.

$$HS125TD=\{(L1-L2)/L1\}\times100$$

wherein,
HS125TD: Thermal shrinkage ratio in transverse direction after heat treatment at 125° C. for 15 minutes
L1: Distance between marked lines before heat treatment (150 mm)
L2: Distance between marked lines after heat treatment.

(16) Coefficient of Static Friction ($\mu_s$)

The coefficient of static friction was measured at 25° C. and 65% RH according to JIS K 7125 (1999) using a slip tester available from Toyo Seiki Seisaku-sho, Ltd. The measurement was performed in such a manner that the film machine directions and the different surfaces of the films overlapped with each other. The same measurement was performed 5 times per sample, and the average value of the obtained values was calculated and taken as the coefficient of static friction ($\mu_s$) of the sample.

(17) Molecular Weight and Molecular Weight Distribution of Polypropylene Resin and Film Evaluation and calculation were performed by GPC (gel permeation chromatography) under the following apparatus and measurement conditions. As sample pretreatment, a sample was weighed under the following measurement conditions, a solvent (1,2,4-TCB to which 0.1% of BHT was added) was added, and the mixture was shaken at 140° C. for 1 hour to dissolve the sample. Next, heat filtration was performed with a sintered filter having a pore size of 0.5 μm to perform fractionation by molecular size.

<Apparatus and Measurement Conditions>
Apparatus: HLC-8321GPC/HT (detector: RT)·
Column:
TSKgel guardcolumn H$_{HR}$ (30) HT (7.5 mm I.D.×7.5 mm)×1 column
+TSKgel GMHHR-H (2θ) HT (7.8mmI.D.×30 cm) (available from Tosoh Corporation)×3 columns
Eluent: 1,2,4-Trichlorobenzene (for GPC manufactured by FUJIFILM Wako Pure Chemical Corporation)+ BHT (0.05%)

Flow rate: 1.0 mL/minute
Detection condition: polarity=(−)
Injection volume: 0.3 mL
Column temperature: 140° C.
System temperature: 40° C.
Sample concentration: 1 mg/mL A calibration curve was produced using standard polystyrene (available from Tosoh Corporation), and a value of the measured molecular weight was converted into a value of polystyrene to obtain a Z+1 average molecular weight ($M_{z+1}$), a weight average molecular weight (Mw), and a number average molecular weight (Mn). Then, the molecular weight distribution ($M_{z+1}$/Mw) was determined using the values of $M_{z+1}$ and Mw.

(18) Evaluation of Film Capacitor Characteristics (Withstand Voltage, Reliability, and Processability at 120° C.)

Aluminum was deposited on one surface of the film with a vacuum deposition machine (available from ULVAC, Inc.), and a vapor deposition pattern having a so-called T-shaped margin (pitch (period) in the machine direction: 17 mm, fuse width: 0.5 mm) due to masking oil, in which a margin portion was provided in a direction perpendicular to the machine direction with a film resistance of 10 Ω/sq, was formed. When the wet tension was different between the front and back surfaces, vapor deposition was performed on the surface having the higher wet tension.

The film on which the vapor deposition pattern was formed was slit to obtain a vapor deposition reel having a film width of 50 mm and an end margin width of 2 mm.

Then, using this reel, the capacitor element was wound with an element winding machine (KAW-4 NHB, available from KAIDO MANUFACTURING CO., LTD.), subjected to metal spraying, and then subjected to a heat treatment at a temperature of 128° C. for 12 hours under reduced pressure, and a lead wire was attached to finish the capacitor element.

Using the obtained 10 capacitor elements, what is called a step-up test was performed in which a voltage of 250 VDC was applied to the capacitor elements at a high temperature of 120° C., and the applied voltage was gradually increased stepwise at 50 VDC/1 minute after a lapse of 10 minutes at the voltage.

<Evaluation of Withstand Voltage>

In the step-up test, the change in electrostatic capacitance in this test was measured and plotted on the graph, and the voltage at the time when the capacitance reached 80% of the initial value was divided by the thickness of the film (the above-described (1)) to give a withstand voltage rating and evaluated as follows.

S: Withstand voltage is 400 V/μm or more.
A: Withstand voltage is 390 V/μm or more and less than 400 V/μm
B: Withstand voltage is 380 V/μm or more and less than 390 V/μm
C: Withstand voltage is less than 380 V/μm.
S, A, and B are usable. C is inferior in practical performance.

<Evaluation of Reliability>

After increasing the voltage until the electrostatic capacitance decreased to 15% or less with respect to the initial value, the capacitor element was disassembled to examine the state of breakdown, and the reliability was evaluated as follows:

S: There is no change in element shape, and penetrating destruction is not observed.
A: There is no change in element shape, and penetrating destruction of 1 or more and 5 or less layers of the film is observed.
B: There is no change in element shape, and penetrating destruction of 6 or more and 10 or less layers of the film is observed.
C: A change in element shape is observed, penetrating destruction of more than 10 layers is observed, or element shape is greatly changed and destroyed.

In the case of S, it can be used without problems, and in A and B, it can be used depending on conditions. C is inferior in practical performance.

<Evaluation of Processability>

The processability was judged on the basis of the following criteria. A capacitor element was produced in the same manner as described above, and the shape of the element was visually observed.

S: The end surface film of the capacitor element is not displaced, wrinkled or deformed, on a level that does not interfere with the subsequent process at all.
A: There is no deformation of the capacitor element, and wrinkles are slightly present, but the capacitor element can be used without any problem.
B: Deformation and wrinkles of the capacitor element are slightly observed, but the capacitor element can be used.
C: The capacitor element is severely deformed and wrinkled, on a level that interferes with the subsequent steps.

In the case of S and A, the element can be used without problems, in the case of B, the element can be used depending on conditions, and in the case of C, the element is difficult to put into practical use.

[Polypropylene Raw Material]

Raw materials shown in Table 1 below were used for production of polypropylene films of examples and comparative examples. Four kinds of raw materials (A1, A2, A3, and A4) were used as a polypropylene raw material A, two kinds of raw materials (B1, B2, and B3) were used as a polypropylene raw material B, and three kinds of raw materials (C1: Ziegler-Natta catalyst system, C2: metallocene catalyst system) were used as a polypropylene raw material C.

Example 1

Raw materials used and the conditions for film formation in the present example are as shown in Tables 1 and 2. First, 92 parts by mass of polypropylene raw material A1, 5 parts by mass of polypropylene raw material B1, and 3 parts by mass of polypropylene raw material C1 were dry-blended. The blended raw material was supplied to a single screw extruder at a temperature of 260° C., melted, passed through a pipe set at a temperature of 255° C. after passing through a filtration filter, and melt-extruded into a sheet shape from a T-shaped slit die set at 250° C. The sheet product was cooled for solidification in closer contact with an air knife on a casting drum maintained at 98° C. to obtain an unstretched polypropylene film. The unstretched polypropylene film was preheated to 143° C. stepwise by a plurality of roll groups, passed between rolls having a circumferential speed difference as it was, preliminarily stretched to 1.08 times at 130° C., and stretched to 6.1 times in the machine direction at 143° C. Subsequently, the film was guided to a tenter, preheated at a temperature of 169° C. (TD stretching temperature +7° C.) with both ends in a film width held by clips, and then stretched to 12.3 times in the transverse direction at a temperature of 162° C. Furthermore, as a heat treatment at a first stage, a heat treatment was performed at 159° C. while 15% relaxation was applied in the transverse direction, and as a heat treatment at a second stage, a heat treatment was performed at 150° C. while holding both ends of the widthwise film with clips in the transverse direction. As a heat treatment at a third stage, the film was guided to the outside of the tenter through the heat treatment at 110° C., the clip at the end of the film was released, then a film surface (on the casting drum contact surface side) was subjected to a corona discharge treatment in the atmosphere at a treatment intensity of 25 W.min/m², and a polypropylene film having a film thickness of 2.3 μm was wound up into a film roll. The evaluation results of each item are shown in Table 4.

Examples 2 to 9 and Comparative Examples 1 to 6

A polypropylene film having a thickness shown in Tables 2 and 3 was obtained in the same manner as in Example 1 except that the raw material composition and the film formation conditions were as shown in Tables 2 and 3. The thickness was adjusted by increasing or decreasing the number of revolutions of the single screw extruder. Hereinafter, the same applies to other Examples and Comparative Examples. The evaluation results are shown in Tables 4 to 6.

TABLE 1-1

|  |  | Polypropylene raw material A | | | | Polypropylene raw material B | | |
|---|---|---|---|---|---|---|---|---|
|  |  | A1 | A2 | A3 | A4 | B1 | B2 | B3 |
| Number average molecular weight Mn | (×10⁴) | 6.2 | 6.4 | 5.8 | 6.5 | 7.8 | 7.2 | 9.0 |
| Z + 1 average molecular weight Mz + 1 | (×10⁶) | 2.2 | 2.4 | 1.4 | 2.6 | 4.0 | 3.5 | 5.0 |
| Meso-pentad fraction | (—) | 0.984 | 0.982 | 0.980 | 0.975 | 0.974 | 0.941 | 0.960 |
| Chip melting point | (° C.) | 168 | 166 | 167 | 167 | 166 | 164 | 162 |
| CXS | (% by mass) | 0.8 | 1.2 | 1.7 | 0.8 | 0.8 | 3.3 | 2.1 |
| Melt tension at 230° C. | (cN) |  |  |  |  |  |  |  |

TABLE 1-2

|  |  | Polypropylene raw material C | |
|---|---|---|---|
|  |  | C1 | C2 |
| Number average molecular weight Mn | (×10⁴) | 5.5 | 5.8 |
| Z + 1 average molecular weight Mz + 1 | (×10⁶) | 1.6 | 1.2 |
| Meso-pentad fraction | (—) |  |  |
| Chip melting point | (° C.) | 166 | 155 |
| CXS | (% by mass) | 2.8 | 1.4 |
| Melt tension at 230° C. | (cN) | 7.2 | 17.0 |

TABLE 2-1

|  |  |  |  | Example 1 | Example 2 | Example 3 | Example 4 | Example 5 |
|---|---|---|---|---|---|---|---|---|
| Raw material | Polypropylene raw material A | A1 | (Parts by mass) | 92 | 95 | 0 | 0 | 0 |
|  |  | A2 | (Parts by mass) | 0 | 0 | 85 | 95 | 0 |
|  |  | A3 | (Parts by mass) | 0 | 0 | 0 | 0 | 87 |
|  |  | A4 | (Parts by mass) | 0 | 0 | 0 | 0 | 0 |
|  | Polypropylene raw material B | B1 | (Parts by mass) | 5 | 5 | 12 | 0 | 10 |
|  |  | B2 | (Parts by mass) | 0 | 0 | 0 | 5 | 0 |
|  |  | B3 | (Parts by mass) | 0 | 0 | 0 | 0 | 0 |
|  | Polypropylene raw material C | C1 | (Parts by mass) | 3 | 0 | 0 | 0 | 3 |
|  |  | C2 | (Parts by mass) | 0 | 0 | 3 | 0 | 0 |

TABLE 2-1-continued

|  |  |  | Example 1 | Example 2 | Example 3 | Example 4 | Example 5 |
|---|---|---|---|---|---|---|---|
| Casting step | Casting drum temperature | (° C.) | 98 | 74 | 95 | 65 | 98 |
| Longitudinal stretching step | Longitudinal preliminary stretching ratio | (Times) | 1.08 | 1.07 | 1.05 | 1.10 | 1.04 |
|  | Longitudinal preliminary stretching temperature | (° C.) | 130 | 134 | 128 | 120 | 138 |
|  | Longitudinal stretching ratio | (Times) | 6.1 | 6.3 | 6.3 | 6.4 | 5.8 |
|  | Longitudinal stretching temperature | (° C.) | 143 | 144 | 140 | 130 | 145 |
| Lateral stretching step | Lateral stretching ratio | (Times) | 12.3 | 12.2 | 11.8 | 11.5 | 12.0 |
|  | Area stretching ratio | (Times) | 75 | 77 | 74 | 74 | 70 |
|  | TD preheating temperature | (° C.) | 169 | 175 | 172 | 178 | 176 |
|  | TD stretching temperature | (° C.) | 162 | 160 | 159 | 163 | 165 |
|  | Heat treatment temperature at first stage | (° C.) | 159 | 158 | 159 | 155 | 158 |
|  | Heat treatment temperature at second stage | (° C.) | 150 | 148 | 146 | 147 | 145 |
|  | Heat treatment temperature at third stage | (° C.) | 110 | 114 | 100 | 105 | 112 |
|  | Relaxation ratio | (%) | 15 | 12 | 10 | 8 | 12 |
|  | Thickness of film | (μm) | 2.3 | 2.2 | 2.1 | 2.0 | 2.5 |

TABLE 2-2

|  |  |  |  | Example 6 | Example 7 | Example 8 | Example 9 |
|---|---|---|---|---|---|---|---|
| Raw material | Polypropylene raw material A | A1 | (Parts by mass) | 0 | 78 | 92 | 0 |
|  |  | A2 | (Parts by mass) | 0 | 0 | 0 | 0 |
|  |  | A3 | (Parts by mass) | 88 | 0 | 0 | 0 |
|  |  | A4 | (Parts by mass) | 0 | 0 | 0 | 72 |
|  | Polypropylene raw material B | B1 | (Parts by mass) | 0 | 18 | 0 | 25 |
|  |  | B2 | (Parts by mass) | 12 | 0 | 5 | 0 |
|  |  | B3 | (Parts by mass) | 0 | 0 | 0 | 0 |
|  | Polypropylene raw material C | C1 | (Parts by mass) | 0 | 0 | 3 | 0 |
|  |  | C2 | (Parts by mass) | 0 | 4 | 0 | 3 |
| Casting step | Casting drum temperature |  | (° C.) | 80 | 92 | 95 | 97 |
| Longitudinal stretching step | Longitudinal preliminary stretching ratio |  | (Times) | 1.03 | 1.07 | 1.06 | 1.10 |
|  | Longitudinal preliminary stretching temperature |  | (° C.) | 138 | 125 | 125 | 139 |
|  | Longitudinal stretching ratio |  | (Times) | 5.9 | 5.2 | 5.9 | 6.2 |
|  | Longitudinal stretching temperature |  | (° C.) | 148 | 142 | 146 | 145 |
| Lateral stretching step | Lateral stretching ratio |  | (Times) | 11.8 | 12.4 | 12.4 | 12.8 |
|  | Area stretching ratio |  | (Times) | 70 | 64 | 73 | 79 |
|  | TD preheating temperature |  | (° C.) | 178 | 175 | 173 | 172 |
|  | TD stretching temperature |  | (° C.) | 158 | 162 | 164 | 165 |
|  | Heat treatment temperature at first stage |  | (° C.) | 155 | 157 | 157 | 157 |
|  | Heat treatment temperature at second stage |  | (° C.) | 142 | 144 | 142 | 146 |
|  | Heat treatment temperature at third stage |  | (° C.) | 104 | 100 | 107 | 103 |
|  | Relaxation ratio |  | (%) | 10 | 15 | 11 | 15 |
|  | Thickness of film |  | (μm) | 3.1 | 2.4 | 5.4 | 2.2 |

TABLE 3-1

|  |  |  |  | Comparative Example 1 | Comparative Example 2 | Comparative Example 3 |
|---|---|---|---|---|---|---|
| Raw material | Polypropylene raw material A | A1 | (Parts by mass) | 0 | 0 | 0 |
|  |  | A2 | (Parts by mass) | 0 | 0 | 20 |
|  |  | A3 | (Parts by mass) | 40 | 0 | 0 |
|  |  | A4 | (Parts by mass) | 0 | 0 | 0 |
|  | Polypropylene raw material B | B1 | (Parts by mass) | 0 | 90 | 0 |
|  |  | B2 | (Parts by mass) | 60 | 0 | 80 |
|  |  | B3 | (Parts by mass) | 0 | 0 | 0 |
|  | Polypropylene raw material C | C1 | (Parts by mass) | 0 | 10 | 0 |
|  |  | C2 | (Parts by mass) | 0 | 0 | 0 |
| Casting step | Casting drum temperature |  | (° C.) | 94 | 98 | 64 |
| Longitudinal stretching step | Longitudinal preliminary stretching ratio |  | (Times) | — | — | — |
|  | Longitudinal preliminary stretching temperature |  | (° C.) | — | — | — |
|  | Longitudinal stretching ratio |  | (Times) | 5.3 | 5.4 | 7.2 |
|  | Longitudinal stretching temperature |  | (° C.) | 138 | 145 | 140 |
| Lateral stretching step | Lateral stretching ratio |  | (Times) | 8.8 | 10.2 | 7.7 |
|  | Area stretching ratio |  | (Times) | 47 | 55 | 55 |
|  | TD preheating temperature |  | (° C.) | 172 | 178 | 175 |
|  | TD stretching temperature |  | (° C.) | 168 | 166 | 165 |
|  | Heat treatment temperature at first stage |  | (° C.) | 140 | 150 | 140 |
|  | Heat treatment temperature at second stage |  | (° C.) | 100 | 120 | 120 |
|  | Heat treatment temperature at third stage |  | (° C.) | 100 | 120 | 120 |
|  | Relaxation ratio |  | (%) | 8 | 4 | 12 |
|  | Thickness of film |  | (μm) | 2.2 | 3.3 | 2.4 |

TABLE 3-2

|  |  |  |  | Comparative Example 4 | Comparative Example 5 | Comparative Example 6 |
|---|---|---|---|---|---|---|
| Raw material | Polypropylene raw material A | A1 | (Parts by mass) | 30 | 90 | 0 |
|  |  | A2 | (Parts by mass) | 0 | 0 | 0 |
|  |  | A3 | (Parts by mass) | 0 | 0 | 0 |
|  |  | A4 | (Parts by mass) | 0 | 0 | 40 |
|  | Polypropylene raw material B | B1 | (Parts by mass) | 70 | 0 | 0 |
|  |  | B2 | (Parts by mass) | 0 | 0 | 40 |
|  |  | B3 | (Parts by mass) | 0 | 10 | 0 |
|  | Polypropylene raw material C | C1 | (Parts by mass) | 0 | 0 | 0 |
|  |  | C2 | (Parts by mass) | 0 | 0 | 20 |

TABLE 3-2-continued

|  |  |  | Comparative Example 4 | Comparative Example 5 | Comparative Example 6 |
|---|---|---|---|---|---|
| Casting step | Casting drum temperature | (° C.) | 100 | 25 | 98 |
| Longitudinal stretching step | Longitudinal preliminary stretching ratio | (Times) | — | — | — |
|  | Longitudinal preliminary stretching temperature | (° C.) | — | — | — |
|  | Longitudinal stretching ratio | (Times) | 6.0 | 6.2 | 5.1 |
|  | Longitudinal stretching temperature | (° C.) | 150 | 121 | 142 |
| Lateral stretching step | Lateral stretching ratio | (Times) | 9.5 | 12.8 | 8.6 |
|  | Area stretching ratio | (Times) | 57 | 79 | 44 |
|  | TD preheating temperature | (° C.) | 180 | 170 | 170 |
|  | TD stretching temperature | (° C.) | 168 | 159 | 165 |
|  | Heat treatment temperature at first stage | (° C.) | 155 | 154 | 150 |
|  | Heat treatment temperature at second stage | (° C.) | 100 | 140 | 110 |
|  | Heat treatment temperature at third stage | (° C.) | 100 | 110 | 110 |
|  | Relaxation ratio | (%) | 15 | 9 | 8 |
|  | Thickness of film | (μm) | 2.1 | 2.4 | 2.1 |

TABLE 4

|  |  |  | Example 1 | Example 2 | Example 3 | Example 4 | Example 5 |
|---|---|---|---|---|---|---|---|
| Raw material characteristics of film | Meso-pentad fraction | (—) | 0.983 | 0.984 | 0.982 | 0.981 | 0.975 |
|  | CXS | (% by mass) | 0.9 | 0.8 | 1.0 | 1.3 | 1.9 |
| Molecular weight distribution of film | Mz + 1/Mw | (—) | 5.8 | 5.7 | 6.2 | 6.6 | 7.1 |
| Thermal characteristics of film | Melting peak temperature (Tm) | (° C.) | 174 | 175 | 174 | 173 | 172 |
|  | Crystallization peak temperature (Tc) | (° C.) | 115 | 110 | 117 | 108 | 114 |
|  | Tm-Tc | (° C.) | 59 | 65 | 57 | 65 | 58 |
|  | SF135MD | (MPa) | 1.1 | 1.1 | 1.2 | 1.6 | 1.9 |
|  | HS125TD | (%) | 0.4 | 0.4 | 0.5 | 0.6 | 1.0 |
| Crystal structure of film | Crystallite size of Through-TD of α crystal (110) plane | (nm) | 8.1 | 8.2 | 8.6 | 8.8 | 8.6 |
|  | Crystallite size of Through-MD of α crystal (110) plane | (nm) | 6.4 | 6.5 | 6.4 | 5.9 | 6.5 |
|  | Difference in crystallite size depending on alignment direction of α crystal (110) plane | (nm) | 1.7 | 2.0 | 2.1 | 2.9 | 2.1 |
|  | Crystal orientation degree of α crystal (110) plane | (—) | 0.83 | 0.79 | 0.80 | 0.82 | 0.79 |
|  | Crystal orientation degree of α crystal (110) plane after heating | (—) | 0.82 | 0.79 | 0.78 | 0.74 | 0.79 |
| Mechanical properties of film | Sum of F5MD and F5TD after heating | (MPa) | 203 | 204 | 198 | 167 | 179 |
| Structure and properties of surface of film | Ssk on Surface A | (—) | 2 | −4 | 9 | 18 | −4 |
|  | Ssk on Surface B | (—) | −14 | −23 | −9 | 4 | −24 |
|  | SpkA | (nm) | 43 | 65 | 39 | 21 | 68 |
|  | SpkB | (nm) | 102 | 125 | 81 | 66 | 119 |
|  | Total volume of valleys with depth of 20 nm or more | (μm³) | 2740 | 3480 | 2672 | 1020 | 3159 |
|  | Sa | (nm) | 41 | 55 | 36 | 21 | 62 |
|  | $\mu_S$ | (—) | 0.52 | 0.47 | 0.63 | 0.78 | 0.42 |

TABLE 4-continued

|  |  |  | Example 1 | Example 2 | Example 3 | Example 4 | Example 5 |
|---|---|---|---|---|---|---|---|
| Electrical characteristics of film | Breakdown voltage at 130° C. | (V/μm) | 426 | 422 | 408 | 421 | 401 |
| Evaluation of film capacitor element | Evaluation of withstand voltage | (—) | S | A | A | S | A |
|  | Evaluation of reliability | (—) | S | S | S | A | A |
|  | Evaluation of processability | (—) | S | S | A | B | S |

TABLE 5

|  |  |  | Example 6 | Example 7 | Example 8 | Example 9 |
|---|---|---|---|---|---|---|
| Raw material characteristics of film | Meso-pentad fraction | (—) | 0.979 | 0.982 | 0.981 | 0.975 |
|  | CXS | (% by mass) | 2.2 | 1.1 | 1.2 | 0.9 |
| Molecular weight distribution of film | Mz + 1/Mw | (—) | 7.1 | 6.2 | 6.6 | 7.6 |
| Thermal characteristics of film | Melting peak temperature (Tm) | (° C.) | 171 | 174 | 172 | 168 |
|  | Crystallization peak temperature (Tc) | (° C.) | 105 | 117 | 115 | 114 |
|  | Tm-Tc | (° C.) | 66 | 57 | 57 | 54 |
|  | SF135MD | (MPa) | 1.9 | 1.3 | 1.7 | 1.4 |
|  | HS125TD | (%) | 0.8 | 0.5 | 1.2 | 0.3 |
| Crystal structure of film | Crystallite size of Through-TD of α crystal (110) plane | (nm) | 8.7 | 8.8 | 8.6 | 8.8 |
|  | Crystallite size of Through-MD of α crystal (110) plane | (nm) | 6.1 | 6.1 | 6.4 | 5.9 |
|  | Difference in crystallite size depending on alignment direction of α crystal (110) plane | (nm) | 2.6 | 2.7 | 2.2 | 2.9 |
|  | Crystal orientation degree of α crystal (110) plane | (—) | 0.78 | 0.76 | 0.78 | 0.77 |
|  | Crystal orientation degree of α crystal (110) plane after heating | (—) | 0.74 | 0.73 | 0.76 | 0.73 |
| Mechanical properties of film | Sum of F5MD and F5TD after heating | (MPa) | 174 | 183 | 181 | 182 |
| Structure and properties of surface of film | Ssk on Surface A | (—) | −15 | −2 | −2 | −8 |
|  | Ssk on Surface B | (—) | −29 | −12 | −21 | −28 |
|  | SpkA | (nm) | 93 | 51 | 56 | 71 |
|  | SpkB | (nm) | 146 | 108 | 121 | 121 |
|  | Total volume of valleys with depth of 20 nm or more | (μm³) | 4810 | 3422 | 4089 | 3956 |
|  | Sa | (nm) | 85 | 49 | 51 | 63 |
|  | $\mu_S$ | (—) | 0.36 | 0.63 | 0.64 | 0.44 |
| Electrical characteristics of film | Breakdown voltage at 130° C. | (V/μm) | 366 | 390 | 355 | 352 |
| Evaluation of film capacitor element | Evaluation of withstand voltage | (—) | B | A | B | B |
|  | Evaluation of reliability | (—) | B | S | A | A |
|  | Evaluation of processability | (—) | A | A | S | A |

TABLE 6-1

|  |  |  | Comparative Example 1 | Comparative Example 2 | Comparative Example 3 |
|---|---|---|---|---|---|
| Raw material characteristics of film | Meso-pentad fraction | (—) | 0.962 | 0.970 | 0.948 |
|  | CXS | (% by mass) | 2.7 | 1.0 | 3.0 |
| Molecular weight distribution of film | Mz + 1/Mw | (—) | 7.8 | 9.1 | 8.2 |
| Thermal characteristics of film | Melting peak temperature (Tm) | (° C.) | 170 | 171 | 168 |
|  | Crystallization peak temperature (Tc) | (° C.) | 104 | 118 | 106 |
|  | Tm-Tc | (° C.) | 66 | 53 | 62 |
|  | SF135MD | (MPa) | 2.5 | 1.9 | 2.1 |
|  | HS125TD | (%) | 2.8 | 2.4 | 0.8 |
| Crystal structure of film | Crystallite size of Through-TD of α crystal (110) plane | (nm) | 9.0 | 9.0 | 8.8 |
|  | Crystallite size of Through-MD of α crystal (110) plane | (nm) | 6.5 | 5.9 | 5.9 |
|  | Difference in crystallite size depending on alignment direction of α crystal (110) plane | (nm) | 2.5 | 3.1 | 2.9 |
|  | Crystal orientation degree of α crystal (110) plane | (—) | 0.74 | 0.76 | 0.82 |
|  | Crystal orientation degree of α crystal (110) plane after heating | (—) | 0.73 | 0.71 | 0.72 |
| Mechanical properties of film | Sum of F5MD and F5TD after heating | (MPa) | 145 | 143 | 138 |
| Structure and properties of surface of film | Ssk on Surface A | (—) | −18 | −28 | 24 |
|  | Ssk on Surface B | (—) | −44 | −56 | 8 |
|  | SpkA | (nm) | 108 | 125 | 18 |
|  | SpkB | (nm) | 160 | 178 | 48 |
|  | Total volume of valleys with depth of 20 nm or more | (μm$^3$) | 6553 | 7152 | 2093 |
|  | Sa | (nm) | 91 | 115 | 15 |
|  | $\mu_s$ | (—) | 0.29 | 0.59 | 1.41 |
| Electrical characteristics of film | Breakdown voltage at 130° C. | (V/μm) | 358 | 340 | 406 |
| Evaluation of film capacitor element | Evaluation of withstand voltage | (—) | B | C | A |
|  | Evaluation of reliability | (—) | C | B | C |
|  | Evaluation of processability | (—) | B | A | C |

TABLE 6-2

|  |  |  | Comparative Example 4 | Comparative Example 5 | Comparative Example 6 |
|---|---|---|---|---|---|
| Raw material characteristics of film | Meso-pentad fraction | (—) | 0.978 | 0.980 | 0.952 |
|  | CXS | (% by mass) | 0.8 | 1.0 | 2.1 |
| Molecular weight distribution of film | Mz + 1/Mw | (—) | 8.8 | 6.0 | 7.6 |
| Thermal characteristics of film | Melting peak temperature (Tm) | (° C.) | 173 | 174 | 165 |
|  | Crystallization peak temperature (Tc) | (° C.) | 106 | 105 | 118 |
|  | Tm-Tc | (° C.) | 67 | 69 | 47 |
|  | SF135MD | (MPa) | 1.8 | 2.1 | 2.6 |
|  | HS125TD | (%) | 1.5 | 2.6 | 2.9 |
| Crystal structure of film | Crystallite size of Through-TD of α crystal (110) plane | (nm) | 9.1 | 8.4 | 9.2 |
|  | Crystallite size of Through-MD of α crystal (110) plane | (nm) | 6.0 | 6.4 | 6.1 |
|  | Difference in crystallite size depending on alignment direction of α crystal (110) plane | (nm) | 3.1 | 2.0 | 3.1 |
|  | Crystal orientation degree of α crystal (110) plane | (—) | 0.78 | 0.80 | 0.75 |
|  | Crystal orientation degree of α crystal (110) plane after heating | (—) | 0.70 | 0.80 | 0.69 |
| Mechanical properties of film | Sum of F5MD and F5TD after heating | (MPa) | 160 | 143 | 139 |
| Structure and properties of surface of film | Ssk on Surface A | (—) | −32 | 26 | −18 |
|  | Ssk on Surface B | (—) | −48 | 18 | −32 |
|  | SpkA | (nm) | 131 | 11 | 101 |
|  | SpkB | (nm) | 168 | 28 | 152 |
|  | Total volume of valleys with depth of 20 nm or more | (μm$^3$) | 7658 | 172 | 6231 |
|  | Sa | (nm) | 55 | 10 | 90 |
|  | $\mu_s$ | (—) | 0.45 | 1.32 | 0.35 |
| Electrical characteristics of film | Breakdown voltage at 130° C. | (V/μm) | 338 | 418 | 342 |
| Evaluation of film capacitor element | Evaluation of withstand voltage | (—) | C | A | C |
|  | Evaluation of reliability | (—) | A | B | B |
|  | Evaluation of processability | (—) | B | C | A |

The invention claimed is:

1. A polypropylene film, wherein
an absolute value of a difference between a crystallite size obtained by scanning an a crystal (110) plane by wide angle X-ray diffraction in a main alignment direction and a crystallite size obtained by scanning an a crystal plane in a direction orthogonal to the main alignment direction is 3.0 nm or less, and
a shrinkage stress in a machine direction (SF 135 MD) is 2.0 MPa or less at 135° C. in a heating process at a temperature elevation rate of 10° C./min in thermomechanical analysis (TMA),
wherein the polypropylene film has a meso-pentad fraction of 0.981 or more as measured by a nuclear magnetic resonance method.

2. The polypropylene film according to claim 1, wherein a crystallite size is 10.0 nm or less, which is obtained by scanning in a direction orthogonal to the main alignment direction of the α crystal (110) plane, as measured by wide angle X-ray diffraction.

3. The polypropylene film according to claim 1, wherein a crystallite size is 10.0 nm or less, which is obtained by scanning in the main alignment direction of the α crystal (110) plane, as measured by wide angle X-ray diffraction.

4. The polypropylene film according to claim 1, wherein the crystal orientation degree of the α crystal (110) plane measured by wide angle X-ray diffraction is 0.77 or more.

5. The polypropylene film according to claim 1, wherein a melting peak temperature (Tm) of the film obtained by heating the film from 30° C. to 260° C. at 20° C./min with a differential scanning calorimetry DSC is 170° C. or higher.

6. The polypropylene film according to claim 1, wherein a melting peak temperature (Tm) of the film obtained by heating the film from 30° C. to 260° C. at 20° C./min with the differential scanning calorimetry DSC, and a crystallization peak temperature (Tc) of the film obtained by lowering a temperature from 260° C. to 30° C. at 20° C./min after the heating satisfy a relationship below: $(Tm-Tc) \leq 65°$ C.

7. The polypropylene film according to claim 1, wherein skewness (Ssk) defined by ISO 25178 on at least one surface of the film is greater than-30 and less than 5.

8. The polypropylene film according to claim 1, wherein a projecting mountain part heights SpkA and SpkB defined in ISO 25178 of a surface A on one side and a surface B on the other side satisfy relationships below:
SpkA<SpkB
20 nm≤SpkA≤100 nm
80 nm≤SpkB≤150 nm,
where,
SpkA: Projecting mountain part height of surface A
SpkB: Projecting mountain part height of surface B.

9. The polypropylene film according to claim 1, wherein an arithmetic mean height (Sa) defined by ISO 25178 on at least one surface of the film is 35 nm or more and 100 nm or less.

10. The polypropylene film according to claim 1, wherein a crystal orientation degree of an a crystal (110) plane is 0.73 or more when the polypropylene film after being heated at 125° C. for 60 minutes is measured by wide angle X-ray diffraction.

11. The polypropylene film according to claim 1, wherein a sum of a stress (F5MD) at 5% elongation in the film machine direction when the film after being heated at 150° C. for 10 minutes is subjected to a tensile test at room temperature and a stress (F5TD) at 5% elongation in the film transverse direction when the film after being heated at 150° C. for 10 minutes is subjected to a tensile test at room temperature is 150 MPa or more.

12. The polypropylene film according to claim 1, wherein a polypropylene component (CXS) dissolved in xylene is 3.0% by mass or less when completely dissolved in xylene and then precipitated at room temperature.

13. The polypropylene film according to claim 1, wherein a total volume obtained by adding up volumes of valleys having a depth of 20 nm or more in a region of 0.561 mm×0.561 mm measured by a scanning white interference microscope on at least one surface is 50 μm³ or more and 5,000 μm³ or less.

14. The polypropylene film according to claim 1, wherein a thermal shrinkage ratio (HS125TD) in a transverse direction is 1.0% or less after heat treatment at 125° C. for 15 minutes.

15. A metal layer laminated film comprising a metal layer on at least one surface of the polypropylene film according to claim 1.

16. A film capacitor comprising the metal layer laminated film according to claim 15.

* * * * *